United States Patent
Liu et al.

(10) Patent No.: US 12,396,004 B2
(45) Date of Patent: Aug. 19, 2025

(54) DISCONTINUOUS RECEPTION ENHANCEMENT WITH MULTIPLE SIDELINK FEEDBACK CHANNEL OPPORTUNITIES

(71) Applicant: QUALCOMM Incorporated, San Diego, CA (US)

(72) Inventors: Chih-Hao Liu, San Diego, CA (US); Xiaoxia Zhang, San Diego, CA (US); Jing Sun, San Diego, CA (US); Giovanni Chisci, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 18/053,473

(22) Filed: Nov. 8, 2022

(65) Prior Publication Data

US 2024/0155622 A1    May 9, 2024

(51) Int. Cl.
*H04W 72/23* (2023.01)
*H04L 1/1812* (2023.01)
*H04L 1/1829* (2023.01)
*H04W 74/0808* (2024.01)

(52) U.S. Cl.
CPC ........... *H04W 72/23* (2023.01); *H04L 1/1816* (2013.01); *H04L 1/1848* (2013.01); *H04L 1/1854* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 2022/0330283 A1 | 10/2022 | Park et al. | |
| 2022/0353945 A1 | 11/2022 | Liu et al. | |
| 2024/0172277 A1* | 5/2024 | Peng | H04L 5/00 |
| 2024/0381379 A1* | 11/2024 | Park | H04L 1/1896 |

FOREIGN PATENT DOCUMENTS

| | | |
|---|---|---|
| EP | 4243313 A1 | 9/2023 |
| WO | WO-2022098202 A1 | 5/2022 |

OTHER PUBLICATIONS

International Search Report and Written Opinion—PCT/US2023/076481—ISA/EPO—Dec. 19, 2023 (2208100WO).

* cited by examiner

*Primary Examiner* — Clemence S Han
(74) *Attorney, Agent, or Firm* — Arun Swain

(57) ABSTRACT

Methods, systems, and devices for wireless communication are described. A user equipment (UE) may receive, while operating in a discontinuous reception mode, a grant scheduling a sidelink data message for the UE over a shared radio frequency spectrum band, the grant indicating a set of feedback channel occasions associated with the sidelink data message. The UE may transmit at least one feedback message indicating a feedback status of the sidelink data message during at least one feedback channel occasion of the set of feedback channel occasions. The UE may initiate, based at least in part on the at least one feedback channel occasion, a round-trip timer associated with the at least one feedback message during which the UE suppresses monitoring for a retransmission of the sidelink data message.

27 Claims, 11 Drawing Sheets

DISCONTINUOUS RECEPTION ENHANCEMENT WITH MULTIPLE SIDELINK FEEDBACK CHANNEL OPPORTUNITIES

FIELD OF TECHNOLOGY

The following relates to wireless communication, including discontinuous reception enhancement with multiple sidelink feedback channel opportunities.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support discontinuous reception (DRX) enhancement with multiple sidelink feedback channel opportunities. For example, the described techniques provide for a user equipment (UE) to select a physical sidelink feedback channel (PSFCH) occasion (e.g., a feedback occasion) from a set of allocated PSFCH occasions after which a round-trip-time (RTT) timer is started. For example, the UE may receive a grant scheduling a transmission to the UE (e.g., such as a sidelink data message being scheduled for transmission to the UE). The grant may further identify the feedback resources allocated to the UE for the sidelink data message. For example, the grant may identify a set of feedback channel occasions (e.g., may configure multiple PSFCH occasions for the hybrid automatic repeat/request (HARD) process of the sidelink data message). The UE may receive the sidelink data message and determine a feedback status for the sidelink data message (e.g., HARQ-acknowledgement (HARQ-ACK) acknowledgement/negative acknowledgement (ACK/NACK) information, such as whether the UE was able to successfully receive and decode the sidelink data message). The UE may transmit a feedback message indicating the feedback status during at least one of the PSFCH occasions and initiate the RTT timer after a PSFCH occasion based on the at least one PSFCH occasion. That is, the RTT timer may be initiated after the same PSFCH occasion that the HARQ-ACK feedback is transmitted or after a different PSFCH occasion in the set of PSFCH occasions. For example, the RTT timer may be initiated after the first PSFCH occasion in the set, after a last PSFCH occasion in the set, after an intermediate PSFCH occasion in the set, or based on the result of LBT procedures performed before each PSFCH occasion (e.g., when operating in a shared channel). In some examples, the duration of the RTT timer may be adjusted based on which PSFCH occasion after which the RTT timer is initiated. Accordingly, the UE may initiate the RTT timer after a PSFCH occasion in the set and, upon expiration, initiate a retransmission timer to monitor for a retransmission of the sidelink data message.

A method for wireless communication at a UE is described. The method may include receiving, while operating in a DRX mode, a grant scheduling a sidelink data message for the UE over a shared radio frequency spectrum band, the grant indicating a set of feedback channel occasions associated with the sidelink data message, transmitting at least one feedback message indicating a feedback status of the sidelink data message during at least one feedback channel occasion of the set of feedback channel occasions, and initiating, based on the at least one feedback channel occasion, a round-trip timer associated with the at least one feedback message during which the UE suppresses monitoring for a retransmission of the sidelink data message.

An apparatus for wireless communication at a UE is described. The apparatus may include a processor, memory coupled with the processor, and instructions stored in the memory. The instructions may be executable by the processor to cause the apparatus to receive, while operating in a DRX mode, a grant scheduling a sidelink data message for the UE over a shared radio frequency spectrum band, the grant indicating a set of feedback channel occasions associated with the sidelink data message, transmit at least one feedback message indicating a feedback status of the sidelink data message during at least one feedback channel occasion of the set of feedback channel occasions, and initiate, based on the at least one feedback channel occasion, a round-trip timer associated with the at least one feedback message during which the UE suppresses monitoring for a retransmission of the sidelink data message.

Another apparatus for wireless communication at a UE is described. The apparatus may include means for receiving, while operating in a DRX mode, a grant scheduling a sidelink data message for the UE over a shared radio frequency spectrum band, the grant indicating a set of feedback channel occasions associated with the sidelink data message, means for transmitting at least one feedback message indicating a feedback status of the sidelink data message during at least one feedback channel occasion of the set of feedback channel occasions, and means for initiating, based on the at least one feedback channel occasion, a round-trip timer associated with the at least one feedback message during which the UE suppresses monitoring for a retransmission of the sidelink data message.

A non-transitory computer-readable medium storing code for wireless communication at a UE is described. The code may include instructions executable by a processor to receive, while operating in a DRX mode, a grant scheduling a sidelink data message for the UE over a shared radio frequency spectrum band, the grant indicating a set of feedback channel occasions associated with the sidelink data message, transmit at least one feedback message indicating a feedback status of the sidelink data message during at least one feedback channel occasion of the set of feedback channel occasions, and initiate, based on the at least one feedback channel occasion, a round-trip timer associated with the at least one feedback message during which the UE suppresses monitoring for a retransmission of the sidelink data message.

Some examples of the method, apparatuses, and non-transitory computer-readable medium described herein may further include operations, features, means, or instructions for identifying a first feedback channel occasion in the set of feedback channel occasions, where the round-trip timer may be initiated after the first feedback channel occasion.

Some examples of the method, apparatuses, and non-transitory computer-readable medium described herein may further include operations, features, means, or instructions for determining that a listen-before-talk (LBT) procedure performed before the first feedback channel occasion was unsuccessful and transmitting the at least one feedback message in a subsequent feedback channel occasion of the set of feedback channel occasions associated with a successful LBT procedure while initiating the round-trip timer after the first feedback channel occasion.

Some examples of the method, apparatuses, and non-transitory computer-readable medium described herein may further include operations, features, means, or instructions for extending a duration of a retransmission timer during which the UE monitors a sidelink channel for a second grant scheduling retransmission of the sidelink data message based on the round-trip timer being initiated after the first feedback channel occasion.

Some examples of the method, apparatuses, and non-transitory computer-readable medium described herein may further include operations, features, means, or instructions for performing an LBT procedure prior to each feedback channel occasion in the set of feedback channel occasions to determine if the feedback channel occasion may be available for transmitting the at least one feedback message and identifying a first feedback channel occasion in the set of feedback channel occasions associated with a successful LBT procedure, where the round-trip timer may be initiated after first feedback channel occasion.

Some examples of the method, apparatuses, and non-transitory computer-readable medium described herein may further include operations, features, means, or instructions for determining that each feedback channel occasion in the set of feedback channel occasions may be associated with an unsuccessful LBT procedure and identifying, based on each feedback channel occasion being associated with an unsuccessful LBT procedure, a last feedback channel occasion in the set of feedback channel occasions, where the round-trip timer may be initiated after the last feedback channel occasion.

Some examples of the method, apparatuses, and non-transitory computer-readable medium described herein may further include operations, features, means, or instructions for identifying a last feedback channel occasion in the set of feedback channel occasions, where the round-trip timer may be initiated after the last feedback channel occasion.

Some examples of the method, apparatuses, and non-transitory computer-readable medium described herein may further include operations, features, means, or instructions for identifying which feedback channel occasion in the set of feedback channel occasions after which the round-trip timer may be to be initiated and selecting a duration for the round-trip timer based on which feedback channel occasion in the set of feedback channel occasions after which the round-trip timer may be to be initiated.

Some examples of the method, apparatuses, and non-transitory computer-readable medium described herein may further include operations, features, means, or instructions for determining an expected scheduling time for the retransmission of the sidelink data message, where the duration for the round-trip timer may be further based on the expected scheduling time.

Some examples of the method, apparatuses, and non-transitory computer-readable medium described herein may further include operations, features, means, or instructions for refraining from monitoring a sidelink channel to detect a second grant scheduling the retransmission of the sidelink data message during a duration of the round-trip timer.

In some examples of the method, apparatuses, and non-transitory computer-readable medium described herein, the round-trip timer may be initiated after the at least one feedback channel occasion during which the at least one feedback message may be transmitted or after a different feedback channel occasion in the set of feedback channel occasions.

In some examples of the method, apparatuses, and non-transitory computer-readable medium described herein, the set of feedback channel occasions include in-band feedback channel occasions or a mixture of in-band feedback channel occasions and out-of-band feedback channel occasions.

DETAILED DESCRIPTION

Figure 1:
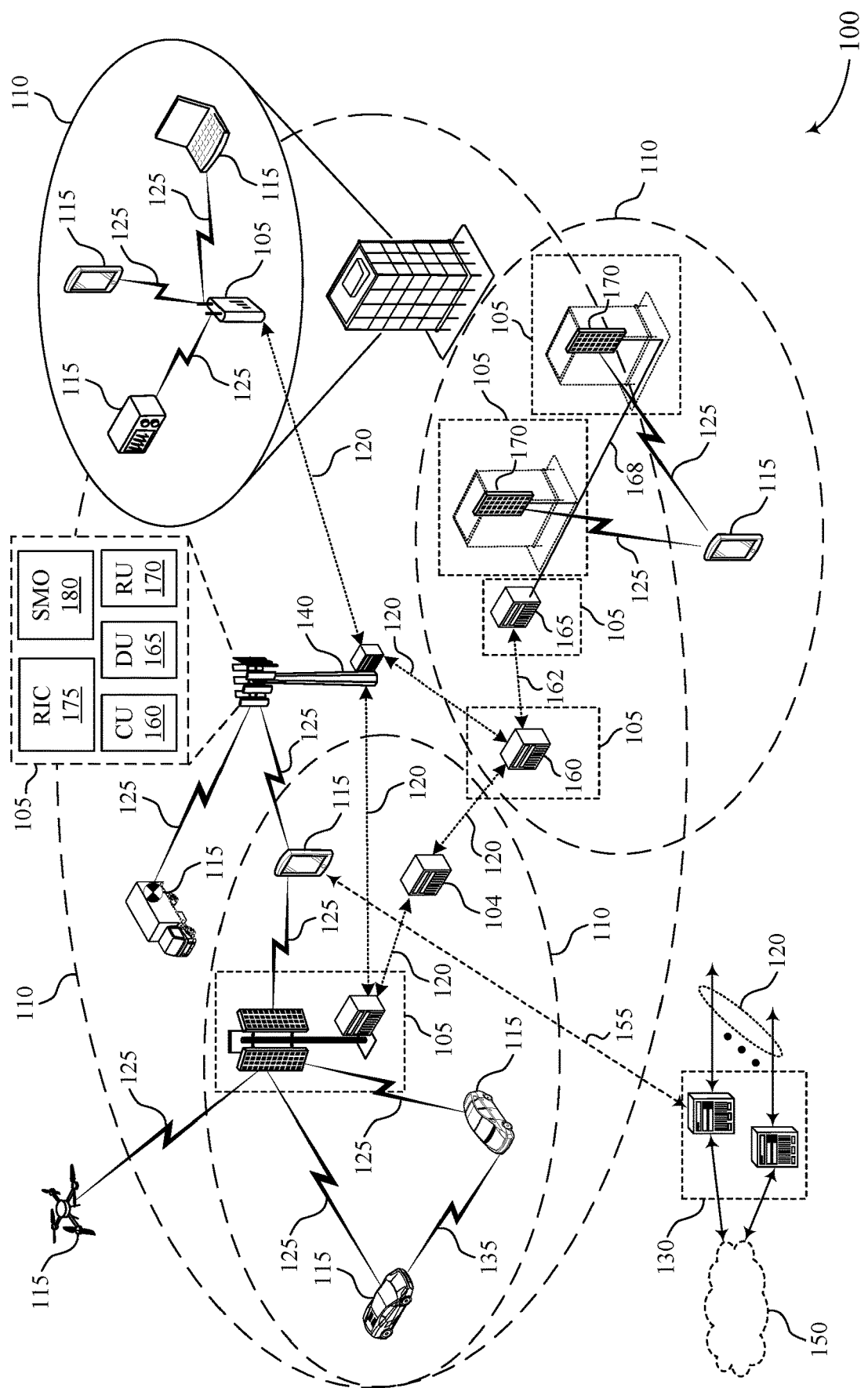
FIG. 1 illustrates an example of a wireless communications system that supports discontinuous reception (DRX) enhancement with multiple sidelink feedback channel opportunities in accordance with one or more aspects of the present disclosure.

Some user equipment (UE) may use a round-trip-time (RTT) timer during hybrid automatic repeat/request-acknowledgement (HARQ-ACK) procedures during a discontinuous reception (DRX) mode. For example, a sidelink UE (e.g., a UE performing sidelink communications) may receiving a grant scheduling a sidelink message to the UE over a shared radio frequency spectrum band. The grant may also identify the resources to be used for transmission of a feedback message for the sidelink message (e.g., HARQ-ACK feedback resources). The UE receives the sidelink message over the allocated resources and transmits the HARQ-ACK feedback (e.g., acknowledgement/negative-acknowledgement (ACK/NACK) information) in the resources. When a NACK is transmitted, the UE expects a retransmission of the sidelink message associated with the NACK. The UE traditionally initiates a RTT timer after the PSFCH occasion (e.g., in the HARQ-ACK resources) that the HARQ-ACK feedback is transmitted where the UE does not expect the retransmission to be scheduled. Instead, the UE can enter a sleep state of the DRX mode where the UE does not monitor a sidelink control channel for the retransmission. Upon expiry of the RTT timer, the UE initiates a retransmission timer during which the UE monitors for a grant scheduling the retransmission and the scheduled retransmission. However, advanced networks may schedule a plurality of physical sidelink feedback channel (PSFCH) occasions (e.g., feedback channel occasions) for the UE. This results in inconsistency and confusion regarding when the UE initiates (e.g., after which PSFCH occasion, such as after the PSFCH occasion in which HARQ-ACK feedback is transmitted or after a different PSFCH occasion) the RTT timer and corresponding retransmission.

Accordingly, the described techniques provide for a UE to select a PSFCH occasion (e.g., a feedback occasion) from a set of allocated PSFCH occasions after which a RTT timer is started. For example, the UE may receive a grant scheduling a transmission to the UE (e.g., such as a sidelink data message being scheduled for transmission to the UE). The grant may further identify the feedback resources allocated to the UE for the sidelink data message. For example, the grant may identify a set of feedback channel occasions (e.g., may configure multiple PSFCH occasions for the HARQ process of the sidelink data message). The UE may receive the sidelink data message and determine a feedback status for the sidelink data message (e.g., HARQ-ACK) acknowledgement/negative acknowledgement (ACK/NACK) information, such as whether the UE was able to successfully receive and decode the sidelink data message). The UE may transmit a feedback message indicating the feedback status during at least one of the PSFCH occasions and initiate the RTT timer after a PSFCH occasion based on the at least one PSFCH occasion. That is, the RTT timer may be initiated after the same PSFCH occasion that the HARQ-ACK feedback is transmitted or after a different PSFCH occasion in the set of PSFCH occasions. For example, the RTT timer may be initiated after the first PSFCH occasion in the set, after a last PSFCH occasion in the set, after an intermediate PSFCH occasion in the set, or based on the result of LBT procedures performed before each PSFCH occasion (e.g., when operating in a shared channel). In some examples, the duration of the RTT timer may be adjusted based on which PSFCH occasion after which the RTT timer is initiated. Accordingly, the UE may initiate the RTT timer after a PSFCH occasion in the set and, upon expiration, initiate a retransmission timer to monitor for a retransmission of the sidelink data message.

Aspects of the disclosure are initially described in the context of wireless communications systems. Aspects of the disclosure are further illustrated by and described with reference to apparatus diagrams, system diagrams, and flowcharts that relate to DRX enhancement with multiple sidelink feedback channel opportunities.

FIG. 1 illustrates an example of a wireless communications system 100 that supports DRX enhancement with multiple sidelink feedback channel opportunities in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support DRX enhancement with multiple sidelink feedback channel opportunities as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNB s or gNB s, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may receive, while operating in a DRX mode, a grant scheduling a sidelink data message for the UE 115 over a shared radio frequency spectrum band, the grant indicating a set of feedback channel occasions associated with the sidelink data message. The UE 115 may transmit at least one feedback message indicating a feedback status of the sidelink data message during at least one feedback channel occasion of the set of feedback channel occasions. The UE 115 may initiate, based at least in part on the at least one feedback channel occasion, a round-trip timer (e.g., the RTT timer) associated with the at least one feedback message during which the UE 115 suppresses monitoring for a retransmission of the sidelink data message.

Figure 2:
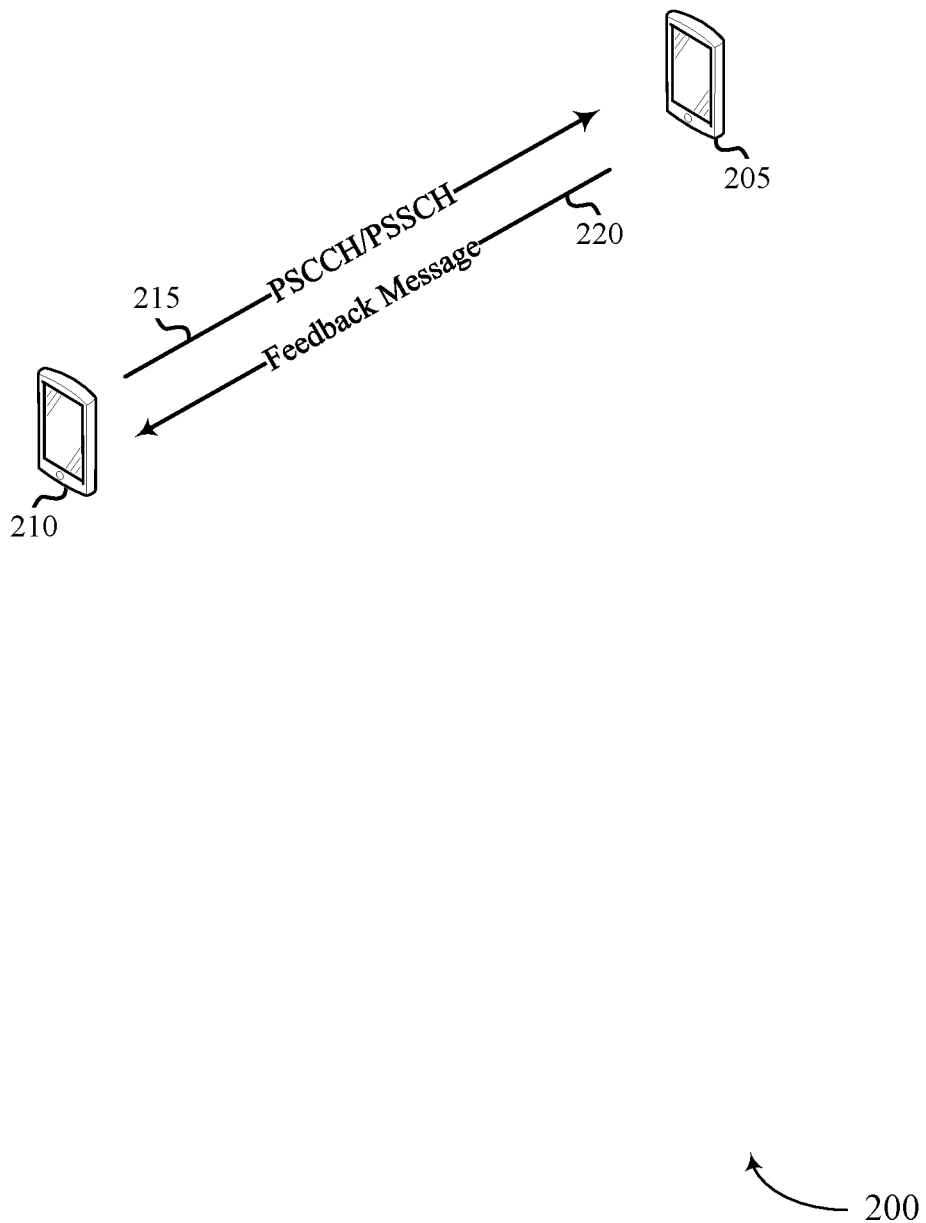
FIG. 2 illustrates an example of a wireless communications system that supports DRX enhancement with multiple sidelink feedback channel opportunities in accordance with one or more aspects of the present disclosure.

FIG. 2 illustrates an example of a wireless communications system 200 that supports DRX enhancement with multiple sidelink feedback channel opportunities in accordance with one or more aspects of the present disclosure. Wireless communications system 200 may implement aspects of wireless communications system 100. Wireless communications system 200 may include a UE 205 and a UE 210, which may be examples of the corresponding devices described herein.

Wireless communications systems may support HARQ-ACK operations for cellular (e.g., Uu interface-based) and/or sidelink (e.g., PC5 interface-based) communications. The HARQ-ACK operations either confirm that the receiving device was able to successfully receive and decode a data message (and/or the grant scheduling transmission of the data message) or confirm that the receiving device was unable to successfully receive and decode the data message (and/or the grant scheduling the data message). In some aspects, the resources (e.g., time, frequency, spatial, and/or code resources) used to convey the HARQ-ACK feedback may be indicated in the grant scheduling the data message and/or may be otherwise known (e.g., (pre)configured or otherwise adopted within the network). A transmitting device receiving an ACK indication in the HARQ-ACK feedback considers the data message transmission successful. A transmitting device receiving a NACK indication in the HARQ-ACK feedback or no feedback considers the data message transmission unsuccessful. Accordingly, the transmitting devices may transmit another grant to the receiving device that schedules a retransmission of the data message associated with the NACK to the receiving device. In some aspects, the data message may be associated with a HARQ process identifier that is used for the initial data message transmission, for transmission of the HARQ-ACK feedback regarding the data message, and/or any associated retransmissions of the data message. The HARQ process identifier associated with a data message may be indicated in the grant scheduling the data message, in RRC signaling (pre)configuring aspects of the data message, or in separate signaling.

For sidelink communications, multiple feedback channel occasions (e.g., PSFCH occasions or candidates) may be allocated for the sidelink data message. Each feedback channel occasion generally defines an opportunity for the receiving device to transmit the HARQ-ACK feedback for the sidelink data message. For example, in some networks the PSFCH HARQ timeline provides one opportunity for PSFCH transmission (e.g., one feedback channel occasion). If the HARQ-ACK feedback occurs in a shared radio frequency spectrum band, a listen-before-talk (LBT) procedure may be performed on the channel just prior to or initially during the feedback channel occasion. If the LBT procedure fails (e.g., the channel is busy, and therefore unavailable to communicate the HARQ-ACK feedback), the transmitting device may interpret the lack of the feedback message as a NACK for the corresponding sidelink data message and schedule a retransmission.

Wireless communication system 200 may support multiple PSFCH occasions or candidates (e.g., feedback channel occasion(s)) for the HARQ-ACK feedback (e.g., the feedback message transmission). That is, to respond to one physical sidelink shared channel (PSSCH) transmission (e.g., a sidelink data message), multiple PSFCH candidates (e.g., a set of feedback channel occasions) may be allocated over different slots with or without multiple frequency-domain multiplexed opportunities in different LBT sub-bands. The receiving device generally transmits the HARQ-ACK feedback at the earliest/closest PSFCH candidate that clears the LBT procedure. For example, the UE (such as the UE 205 and/or the UE 210) may determine the slot(s) and/or resource block (RB) set(s) for the HARQ-ACK feedback transmission based on the HARQ timeline and the (pre) configured resources for the multiple PSFCH candidates. Accordingly, one PSSCH slot (e.g., the slot during which the sidelink data message is transmitted) may be mapped to different PSFCH instances in the time domain and/or different PSFCH resources in different RB set(s).

A UE (e.g., such as the UE 205 and/or the UE 210) may also operate in a DRX mode where, when there is no expected uplink or downlink data (or sidelink data), the UE enters a sleep mode (e.g., turns off one or more modules, components, functions, and the like) and refrains from monitoring the channel. In some aspects, the DRX operations may be for a specific HARQ process identifier such that, while in the DRX sleep mode for the HARQ identifier associated with a given sidelink communication, the UE may turn to other operations or communications (e.g., perform other communications or functions during the DRX sleep period for that HARQ process identifier). This enables the UE to conserve power (at least with respect to the HARQ process identifier) by turning off such modules or functions.

For cellular networks (e.g., Uu-based networks), the DRX procedure may be defined for the UE. In the downlink, the UE may start a RTT timer (e.g., a drx-HARQ-RTT-TimerDL) for the corresponding HARQ process after the HARQ feedback. If a drx-HARQ-RTT-TimerDL timer expires and the data was not successfully decoded, the UE starts a retransmission timer (e.g., drx-RetransmissionTimerDL) for the corresponding HARQ process after the expiry of drx-HARQ-RTT-TimerDL timer. IN the uplink, the UE start the drx-HARQ-RTT-TimerUL for the corresponding HARQ process in the first symbol after the end of the first transmission (within a bundle) of the corresponding PUSCH transmission. If the drx-HARQ-RTT-TimerUL timer expires, the UE starts the drx-RetransmissionTimerUL timer for the corresponding HARQ process in the first symbol after the expiry of drx-HARQ-RTT-TimerUL timer. For NR-U communications, if the PDSCH-to-HARQ_feedback timing value indicates a non-numerical k1 value, the UE starts the drx-RetransmissionTimerDL in the first symbol after the PDSCH transmission for the corresponding HARQ process.

However, such techniques may be insufficient to support HARQ for sidelink communications in some examples. For unicast or groupcast option 2 transmissions, the RTT timer used for sidelink communications (e.g., sl-drx-HARQ-RTT-Timer) is started in the first slot after the corresponding PSFCH instance which carries the HARQ-ACK feedback or if the HARQ-ACK feedback is dropped due to a priority rule. For groupcast option 1 sidelink communications (e.g., NACK only HARQ-ACK feedback), the sl-drx-HARQ-RTT-Timer is started in the first slot after the corresponding PSFCH instance which carries the NACK feedback, or the NACK feedback is dropped due to a priority rule, or the NACK feedback is not transmitted due to a positive acknowledgement (e.g., ACK). However, when multiple PSFCH candidates are introduced, this results in confusion regarding when does the UE start the RTT timer (e.g., ambiguity regarding which PSFCH occasion is associated with the UE starting the sl-drx-HARQ-RTT-Timer).

Accordingly, aspects of the techniques described herein provide various techniques for determining when a UE (e.g., the UE 205 in this example) initiates or otherwise starts the RTT timer for a sidelink data message when a set of feedback channel occasions (e.g., PSFCH occasions or candidates) are indicated for the sidelink data message. For example, at 215 the UE 210 (e.g., a transmitting device, or transmitting sidelink UE in this example) may transmit or otherwise provide a grant scheduling the sidelink data message to the UE 205. The sidelink data message may be scheduled over a shared radio frequency spectrum band (e.g., in an unlicensed band where an LBT procedure is performed before transmission on the channel). The grant may include a sidelink control information-1 (SCI-1) message transmitted over a physical sidelink control channel (PSCCH) and/or a SCI-2 message transmitted over the PSSCH. In some examples, the grant may include both the SCI-1 message and the SCI-2 message. The UE 210 may transmit or otherwise provide the sidelink data message to the UE 205 according to the grant. The grant may indicate or otherwise identify a set of feedback channel occasions (e.g., PSFCH occasions or candidates) associated with the sidelink data message. The set of feedback channel occasions may be in the same or in different LBT band(s) and/or RB set(s) relative to the sidelink data message and/or grant. The set of feedback channel occasions may be in the same or in different slot(s) relative to the sidelink data message and/or grant.

The UE 205 may receive or otherwise obtain the grant and monitor the allocated resources to receive or otherwise obtain the sidelink data message. The UE 205 may identify or otherwise determine a feedback status of the sidelink data message. The feedback status may include an ACK status when the UE 205 is able to successfully receive and decode (e.g., recover sidelink data from) the sidelink data message and/or the grant scheduling the sidelink data message or a NACK status when the UE 205 is unable to successfully receive and decode the sidelink data message and/or the grant scheduling the sidelink data message. Accordingly, the UE 205 may transmit or otherwise provide a feedback message at 220 indicating the feedback status of the sidelink data message during at least one feedback channel occasion from the set of feedback channel occasions.

The UE 205 may start or otherwise initiate a round-trip timer (e.g., the RTT timer, Sl-drx-HARQ-RTT-Timer) based at least on the feedback channel occasion during which the feedback message was transmitted. For example, the UE 205 may initiate the RTT timer in the first symbol or slot after the feedback channel occasion that the feedback message was transmitted, after the first feedback channel occasion in the set, after an intermediate feedback channel occasion in the set, or after the last feedback channel occasion in the set of feedback channel occasions. In some examples, the RTT timer may be initiated after the feedback channel occasion associated with a successful LBT procedure (e.g., based on the result of the LBT procedure performed just before or initially during each feedback channel occasion).

In some examples, the duration of the RTT timer may be selected, modified, or otherwise set to a value that is based on which feedback channel occasion in the set after which the RTT timer is started. For example, when the UE 205 initiates the RTT timer after a first or early PSFCH occasion in the set, the duration of the RTT timer may be extended (e.g., to extend beyond the remaining PSFCH occasions in the set). As another example, when the UE 205 initiates the RTT timer after the last or a later PSFCH occasion in the set, the duration of the RTT timer may be shortened in anticipation of retransmission of the sidelink data message. In some examples, the duration of the RTT timer may be based on when the retransmission is expected to be scheduled. For example, the duration of the RTT timer may be based on when the UE 205 expects the retransmission of the sidelink data message to be scheduled by the UE 210.

While the RTT timer is initiated, the UE 205 may generally refrain from monitoring for a retransmission of the sidelink data message. After expiration of the RTT timer, the UE 205 may start or otherwise initiate a retransmission timer (e.g., sl-drx-RetransmissionTimer) during which the UE 205 monitors for a grant scheduling a retransmission of the sidelink data message and/or the retransmission of the sidelink data message. That is, the UE 205 may set the retransmission timer with a duration covering the expected receipt of the grant and retransmission of the sidelink data message. In some examples, the duration of the retransmission timer may be selected, modified, or otherwise set to a value that is based on which feedback channel occasion in the set after which the RTT timer is started. For example, when the UE 205 initiates the RTT timer after a first or early PSFCH occasion in the set, the duration of the retransmission timer may be extended (e.g., to reduce the retransmission time). While the retransmission timer is running (e.g., has not expired), the UE 205 may generally monitor for a retransmission of the sidelink data message (e.g., for the grant scheduling the retransmission and/or for the retransmission of the sidelink data message).

Figure 3A:
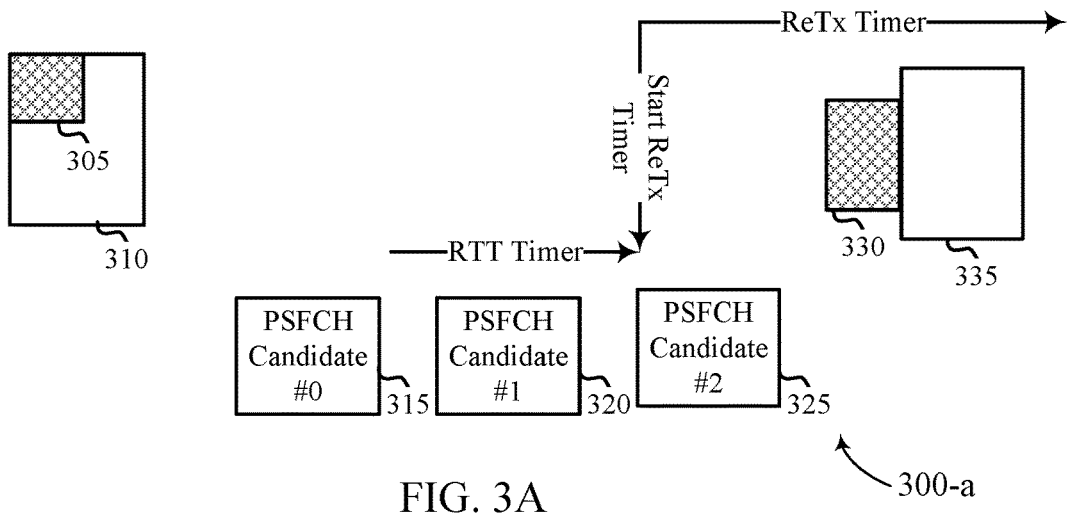
FIGS. 3A-3C illustrate examples of feedback configurations that support DRX enhancement with multiple sidelink feedback channel opportunities in accordance with one or more aspects of the present disclosure.
Figure 3B:
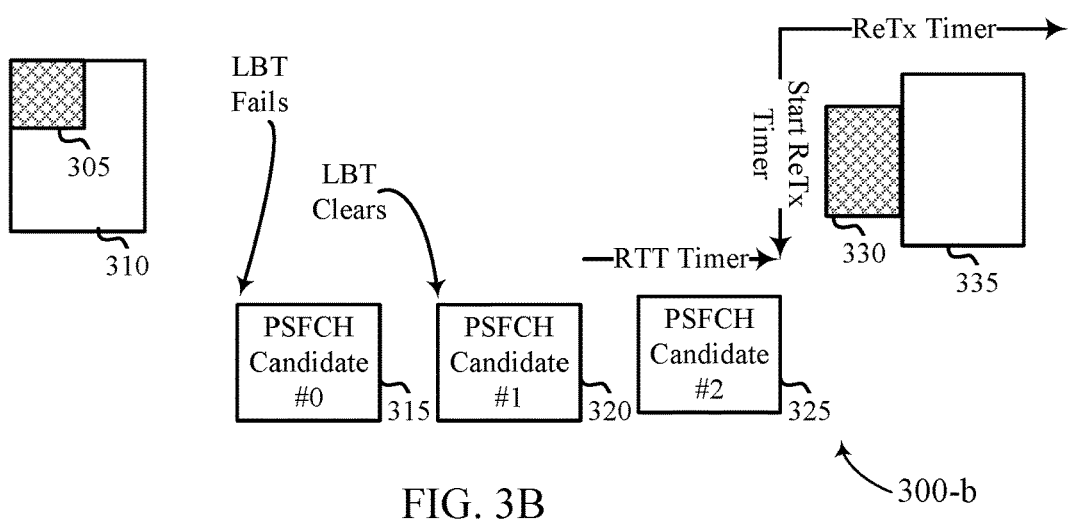
Figure 3C:
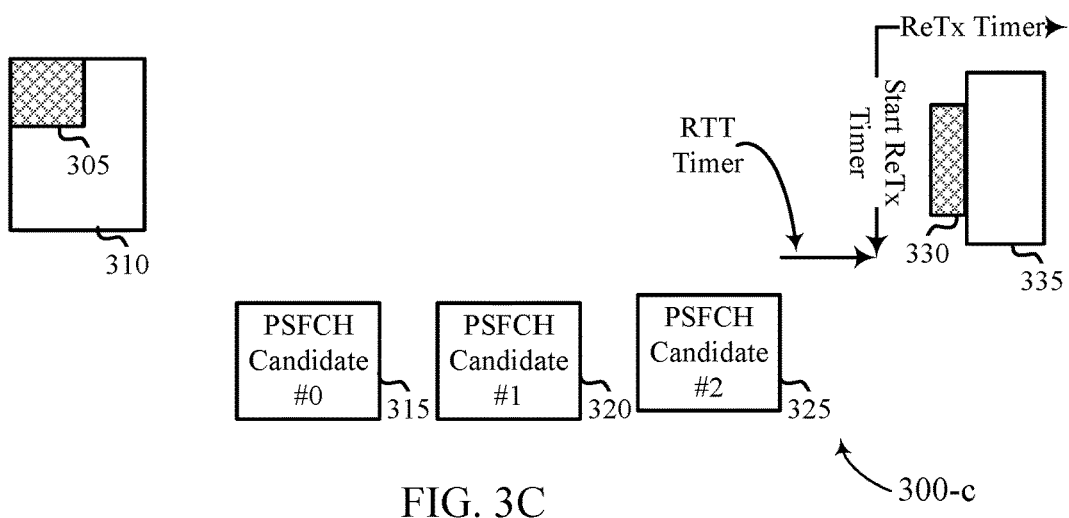

FIGS. 3A-C illustrate examples of feedback configurations 300 that support DRX enhancement with multiple sidelink feedback channel opportunities in accordance with one or more aspects of the present disclosure. Feedback configurations 300 may implement aspects of wireless communications systems 100 and/or 200. Aspects of feedback configurations 300 may be implemented at or implemented by a UE, which may be an example of the corresponding device described herein.

As discussed above, aspects of the techniques described herein provide for a UE to start or otherwise initiate a RTT timer after a feedback channel occasion (e.g., PSFCH candidate) in a set of feedback channel occasions based, at least to some degree, on which PSFCH candidate is selected. The UE may receive the sidelink data message, determine the feedback status for the message, and transmit a feedback message indicating the feedback message to the transmitting device (e.g., the sidelink UE scheduling transmission of the sidelink data message to the UE). The UE may initiate a RTT timer after one of the PSFCH candidates based, at least to some degree, on which PSFCH candidate is selected for transmitting the feedback message.

For example and turning first to feedback configuration 300-a of FIG. 3A, the UE may receive or otherwise obtain a grant scheduling a sidelink data message for the UE over a shared (e.g., unlicensed) band. This may include the UE receiving a grant 305 in SCI message(s) scheduling the sidelink data message 310, with the sidelink data message 310 being received over a PSSCH. The grant 305 may indicate or otherwise identify resources (e.g., time resources, frequency resources, spatial resource, or code resources) for the sidelink data message 310 in the PSSCH. The grant 305 may also indicate or otherwise identify a set of feedback channel occasions. In the non-limiting example illustrated in feedback configuration 300-a, three feedback channel occasions are shown by way of example only. Accordingly and in this example, the set of feedback channel occasions includes a feedback channel occasion 315 (e.g., for PSFCH candidate #0), a feedback channel occasion 320 (e.g., for PSFCH candidate #1), and a feedback channel occasion 325 (e.g., for PSFCH candidate #2).

Each PSFCH candidate in the set of PSFCH candidates (e.g., the set of feedback channel occasions) may generally identify the resources (e.g., time resources, frequency resources, spatial resources, or the code resources) and/or other parameters to be used by the UE for transmitting a feedback message indicating the feedback status of the sidelink data message 310 (e.g., whether the UE was able to successfully receive and decode the grant 305 and/or the sidelink data message 310). As discussed, the sidelink data message may be communicated in a shared or unlicensed band such that an LBT procedure is performed just before or at the start of each PSFCH candidate in the set to determine if the feedback message can be transmitted (e.g., to make sure the channel is free or otherwise available for use).

Feedback configuration 300-a illustrates an example where the UE initiates the RTT timer after the first feedback channel occasion in the set of feedback channel occasions (e.g., in the first symbol or slot after the feedback channel occasion 315). That is, the UE may identify or otherwise determine which PSFCH candidate in the set is the first PSFCH candidate (e.g., PSFCH candidate #0) and initiate the RTT timer in the first symbol or slot after the first PSFCH candidate in the set. The UE may identify the first PSFCH candidate in the set based on the grant 305, or in other signaling (pre)configuring the set of PSFCH candidates for the HARQ process associated with the sidelink data message. That is, in this example the UE may default to the first PSFCH candidate after which the RTT timer is started.

In some aspects, the UE may or may not be able to transmit the feedback message after the first PSFCH candidate, but may still start or otherwise initiate the RTT timer after the first PSFCH candidate. That is, the UE may fail the LBT at the first slot (e.g., the slot the first PSFCH candidate is in), but the UE may still initiate the RTT timer after the feedback channel occasion 315. Instead, the UE may continue to perform LBT procedures before each PSFCH candidate and transmit the feedback message in the PSFCH candidate associated with a successful LBT procedure.

In some aspects, the duration of the retransmission (ReTx) timer (e.g., sl-drx-RetransmissionTimer) based on the RTT timer being initiated after the first PSFCH candidate (e.g., extending the duration of the ReTx timer). As discussed above, the UE may be operating in a DRX mode where the UE sleeps relative to the HARQ process identifier associated with the sidelink data message 310. During the ReTx timer, the UE may monitor for a grant scheduling a retransmission of the sidelink data message and/or for the retransmission of the sidelink data message. In feedback configuration 300-a, this may include the UE monitoring for a grant 330 scheduling retransmission of the sidelink data message 335. In some examples, a longer ReTx timer may help accommodate the HARQ-ACK LBT uncertainty of the channel.

Turning next to feedback configuration 300-b of FIG. 3B, the UE may receive or otherwise obtain a grant scheduling a sidelink data message for the UE over a shared (e.g., unlicensed) band. This may include the UE receiving a grant 305 in SCI message(s) scheduling the sidelink data message 310, with the sidelink data message 310 being received over a PSSCH. The grant 305 may indicate or otherwise identify resources for the sidelink data message 310 in the PSSCH. The grant 305 may also indicate or otherwise identify a set of feedback channel occasions. In the non-limiting example illustrated in feedback configuration 300-b, three feedback channel occasions are shown by way of example only. Accordingly and in this example, the set of feedback channel occasions includes a feedback channel occasion 315 (e.g., for PSFCH candidate #0), a feedback channel occasion 320 (e.g., for PSFCH candidate #1), and a feedback channel occasion 325 (e.g., for PSFCH candidate #2).

Each PSFCH candidate in the set of PSFCH candidates (e.g., the set of feedback channel occasions) may generally identify the resources and/or other parameters to be used by the UE for transmitting a feedback message indicating the feedback status of the sidelink data message 310. As discussed, the sidelink data message may be communicated in a shared or unlicensed band such that an LBT procedure is performed just before or at the start of each PSFCH candidate in the set to determine if the feedback message can be transmitted.

Feedback configuration 300-b illustrates an example where the UE initiates the RTT timer after the first feedback channel occasion in the set of feedback channel occasions (e.g., in the first symbol or slot after the feedback channel occasion) that is associated with a successful LBT procedure. That is, the UE may perform an LBT procedure immediately before or at the start of each PSFCH candidate and initiate the RTT timer in the first symbol or slot after the first PSFCH candidate in the set having a successful LBT procedure. That is, in this example the UE may base which PSFCH candidate after which the RTT timer is started based on the result of the LBT procedure performed for each PSFCH candidate.

In feedback configuration 300-b, the UE may perform an LBT procedure associated with the feedback channel occasion 315 and determine that the LBT procedure was unsuccessful (e.g., the UE was unable to capture the channel). The UE may perform another LBT procedure associated with the feedback channel occasion 320 and determine that the LBT procedure was successful (e.g., the UE was able to capture the channel for transmitting the feedback message). Accordingly and in this example, the UE may start or otherwise initiate the RTT timer after the feedback channel occasion 320 where the UE refrains from monitoring for a grant 330 scheduling a retransmission of the sidelink data message 335 and, optionally, transmit the feedback message during the feedback channel occasion 320.

In the event the UE determines that each PSFCH candidate in the set is associated with an unsuccessful LBT procedure (e.g., the LBT procedure fails for all PSFCH candidates), the UE may initiate the RTT timer after the last PSFCH candidate in the set (e.g., after the feedback channel occasion 325). For example, the UE may identify or otherwise determine the last PSFCH candidate in the set and, based on each PSFCH candidate having an unsuccessful LBT procedure, start the RTT timer after the last feedback channel occasion (e.g., after the feedback channel occasion 320).

Accordingly, feedback configuration 300-b illustrates an example where a sidelink receiving device (e.g., the UE) starts the RTT timer right after the first PSFCH transmission or the last PSFCH candidate slot if all the LBT procedures fail. Starting the RTT timer after the feedback message transmission allows the UE to start the retransmission timer with more accurate timing (e.g., if ACK/NACK feedback is detected at the sidelink transmitting device. If the LBT procedures fail at each PSFCH candidate, the sidelink transmitting device may assume a NACK after the last PSFCH candidate and retransmit the transport block (TB) (e.g., the sidelink data message 335). Accordingly, the RTT timer may be started after the last PSFCH candidate when the shared or unlicensed channel is unavailable to transmit the feedback message.

In some examples, the UE may transmit or otherwise provide multiple feedback message transmissions to ensure the transmitting device is able to receive the feedback status indication. If the transmitting device determines that the HARQ-ACK feedback is missed or dropped (e.g., is not received), if the feedback message transmission is repeated in the remaining PSFCH candidates, starting the RTT timer after the first transmission feedback message transmission may also be considered. If the feedback message is only transmitted once (e.g., after the first PSFCH candidate associated with a successful LBT procedure) but not received by the transmitting device, then the transmitting device may wait until the last PSFCH candidate to assume a NACK and retransmit the sidelink data message 335. In that situation, then the ReTx timer may be started too early. Therefore the ReTx timer duration may be extended based on which PSFCH candidate after which the RTT timer is started.

As discussed above, the UE may be operating in a DRX mode where the UE sleeps relative to the HARQ process identifier associated with the sidelink data message 310. During the ReTx timer, the UE may monitor for a grant scheduling a retransmission of the sidelink data message and/or for the retransmission of the sidelink data message. In feedback configuration 300-b, this may include the UE monitoring for a grant 330 scheduling retransmission of the sidelink data message 335.

Turning to feedback configuration 300-c of FIG. 3C, the UE may receive or otherwise obtain a grant scheduling a sidelink data message for the UE over a shared (e.g., unlicensed) band. This may include the UE receiving a grant 305 in SCI message(s) scheduling the sidelink data message 310, with the sidelink data message 310 being received over a PSSCH. The grant 305 may indicate or otherwise identify resources for the sidelink data message 310 in the PSSCH. The grant 305 may also indicate or otherwise identify a set of feedback channel occasions. In the non-limiting example illustrated in feedback configuration 300-c, three feedback channel occasions are shown by way of example only. Accordingly and in this example, the set of feedback channel occasions includes a feedback channel occasion 315 (e.g., for PSFCH candidate #0), a feedback channel occasion 320 (e.g., for PSFCH candidate #1), and a feedback channel occasion 325 (e.g., for PSFCH candidate #2).

Each PSFCH candidate in the set of PSFCH candidates (e.g., the set of feedback channel occasions) may generally identify the resources and/or other parameters to be used by the UE for transmitting a feedback message indicating the feedback status of the sidelink data message 310. As discussed, the sidelink data message 310 may be communicated in a shared or unlicensed band such that an LBT procedure is performed just before or at the start of each PSFCH candidate in the set to determine if the feedback message can be transmitted.

Feedback configuration 300-c illustrates an example where the UE initiates the RTT timer after the last feedback channel occasion in the set of feedback channel occasions. That is, the UE may or may not perform an LBT procedure immediately before or at the start of each PSFCH candidate and initiate the RTT timer in the first symbol or slot after the last PSFCH candidate, regardless of the results of the LBT procedure(s). That is, in this example the UE may base which PSFCH candidate after which the RTT timer is started based on the PSFCH candidate #2 being the last PSFCH candidate in the set of PSFCH candidates.

Accordingly and in this example, the UE may start or otherwise initiate the RTT timer after the feedback channel occasion 320 where the UE refrains from monitoring for a grant 330 scheduling a retransmission of the sidelink data message 335.

Accordingly, feedback configuration 300-c illustrates an example where a sidelink receiving device (e.g., the UE) starts the RTT timer right after the last PSFCH candidate slot. Starting the RTT timer after the last PSFCH candidate may decrease latency, such as when feedback message is transmitted in the last or near the last PSFCH candidate in the set (or when the HARQ-ACK feedback is missed by the transmitting device, such as in a groupcast option 1 scenario). For groupcast option 1, the UE (e.g., the sidelink transmitting device) may wait until the last PSFCH candidate to determine the feedback status (e.g., to conserve power, prioritize processes/communications, and so forth). To make sure the retransmission is after the retransmission timer has started, the transmitting device may select ReTx resource after the last PSFCH candidate and/or the duration of the RTT timer may be shorter to permit monitoring the ReTx resource.

As discussed above, the UE may be operating in a DRX mode where the UE sleeps relative to the HARQ process identifier associated with the sidelink data message 310. During the ReTx timer, the UE may monitor for a grant scheduling a retransmission of the sidelink data message and/or for the retransmission of the sidelink data message. In feedback configuration 300-c, this may include the UE monitoring for a grant 330 scheduling retransmission of the sidelink data message 335.

Figure 4:
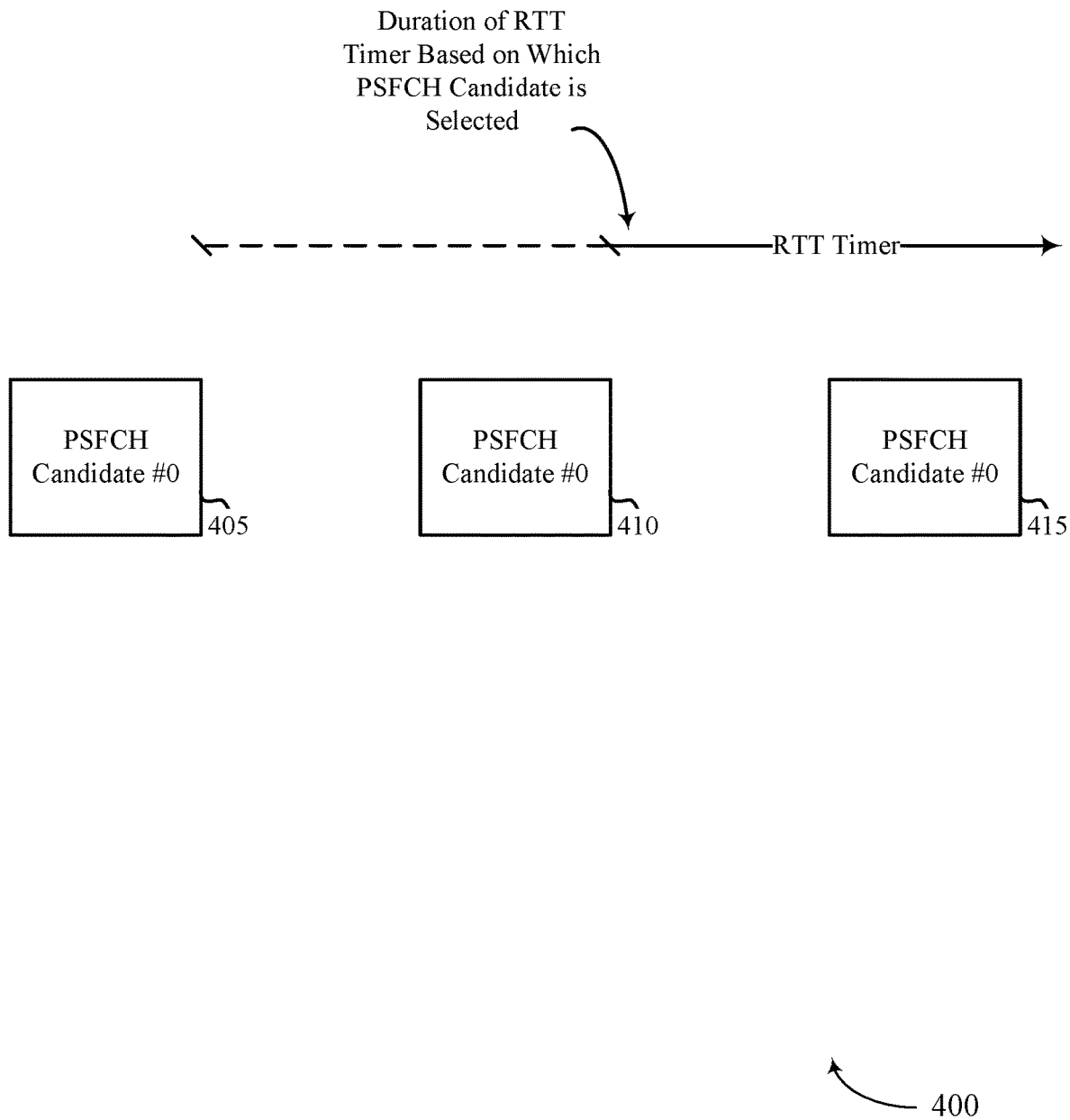
FIG. 4 illustrates an example of a feedback configuration that supports DRX enhancement with multiple sidelink feedback channel opportunities in accordance with one or more aspects of the present disclosure.

FIG. 4 illustrates an example of a feedback configuration 400 that supports DRX enhancement with multiple sidelink feedback channel opportunities in accordance with one or more aspects of the present disclosure. Feedback configuration 400 may implement aspects of wireless communications systems 100 and/or 200 and/or aspects of feedback configuration 300. Aspects of feedback configuration 400 may be implemented at or implemented by a UE, which may be an example of the corresponding device described herein.

As discussed above, aspects of the techniques described herein provide for a UE to start or otherwise initiate a RTT timer after a feedback channel occasion (e.g., PSFCH candidate) in a set of feedback channel occasions based, at least to some degree, on which PSFCH candidate is selected. The UE may receive the sidelink data message, determine the feedback status for the message, and transmit a feedback message indicating the feedback message to the transmitting device (e.g., the sidelink UE scheduling transmission of the sidelink data message to the UE). The UE may initiate a RTT timer after one of the PSFCH candidates based, at least to some degree, on which PSFCH candidate is selected for transmitting the feedback message.

For example, the UE may receive or otherwise obtain a grant scheduling a sidelink data message for the UE over a shared (e.g., unlicensed) band. This may include the UE receiving a grant in SCI message(s) scheduling the sidelink data message, with the sidelink data message being received over a PSSCH. The grant may indicate or otherwise identify resources (e.g., time resources, frequency resources, spatial resource, or code resources) for the sidelink data message in the PSSCH. The grant may also indicate or otherwise identify a set of feedback channel occasions. In the non-limiting example illustrated in FIG. 4, three feedback channel occasions are shown by way of example only. Accordingly and in this example, the set of feedback channel occasions includes a feedback channel occasion 405 (e.g., for PSFCH candidate #0), a feedback channel occasion 410 (e.g., for PSFCH candidate #1), and a feedback channel occasion 415 (e.g., for PSFCH candidate #2).

However, in the example illustrated in FIG. 4 the duration of the RTT timer may be selected based on the first feedback channel occasion in the set associated with initiating the RTT timer. That is, in some examples the grant initially scheduling the sidelink data message transmission to the UE may also identify the retransmission resources to be used.

Thus, the UE may know when the retransmission timer will need to be started in order to monitor for the retransmission of the sidelink data message. When the UE is aware of the retransmission resource (e.g., an expected scheduling time for the retransmission) of the sidelink data message, the UE may select the duration of the RTT more accurately. In some aspects, this may include the RTT timer being set based on when the RTT timer is started (e.g., after which PSFCH candidate) in the set of PSFCH candidate locations and the start of the retransmission resource. This may include setting the duration of the RTT timer to expire a (pre)defined time before the beginning of the retransmission resource.

Accordingly and as shown in FIG. 4, the RTT timer may be started after the feedback channel occasion 405, after the feedback channel occasion 410, or after the feedback channel occasion 415, and the duration of the RTT timer may be set based on which PSFCH candidate after which the RTT timer is selected. For example, if the RTT timer is started after the feedback channel occasion 405, the UE may extend the duration of the RTT timer. If the RTT timer is started after the feedback channel occasion 410, the UE may shorten the duration of the RTT timer or use a (pre) configured duration. If the RTT timer is started after the feedback channel occasion 415, the UE may shorten the duration of the RTT timer. This may support a duration of the RTT timer that is different from (e.g., modified) a (pre)configured or otherwise determined RTT timer duration.

Accordingly, the UE may transmit the feedback message to the transmitting device and refrain from monitoring for the retransmission during the duration of the RTT timer. Upon expiry of the RTT timer, the UE may switch to the awake or active state of the DRX mode and monitor a channel for a grant scheduling a retransmission of the sidelink message and/or the retransmission of the sidelink message.

Figure 5:
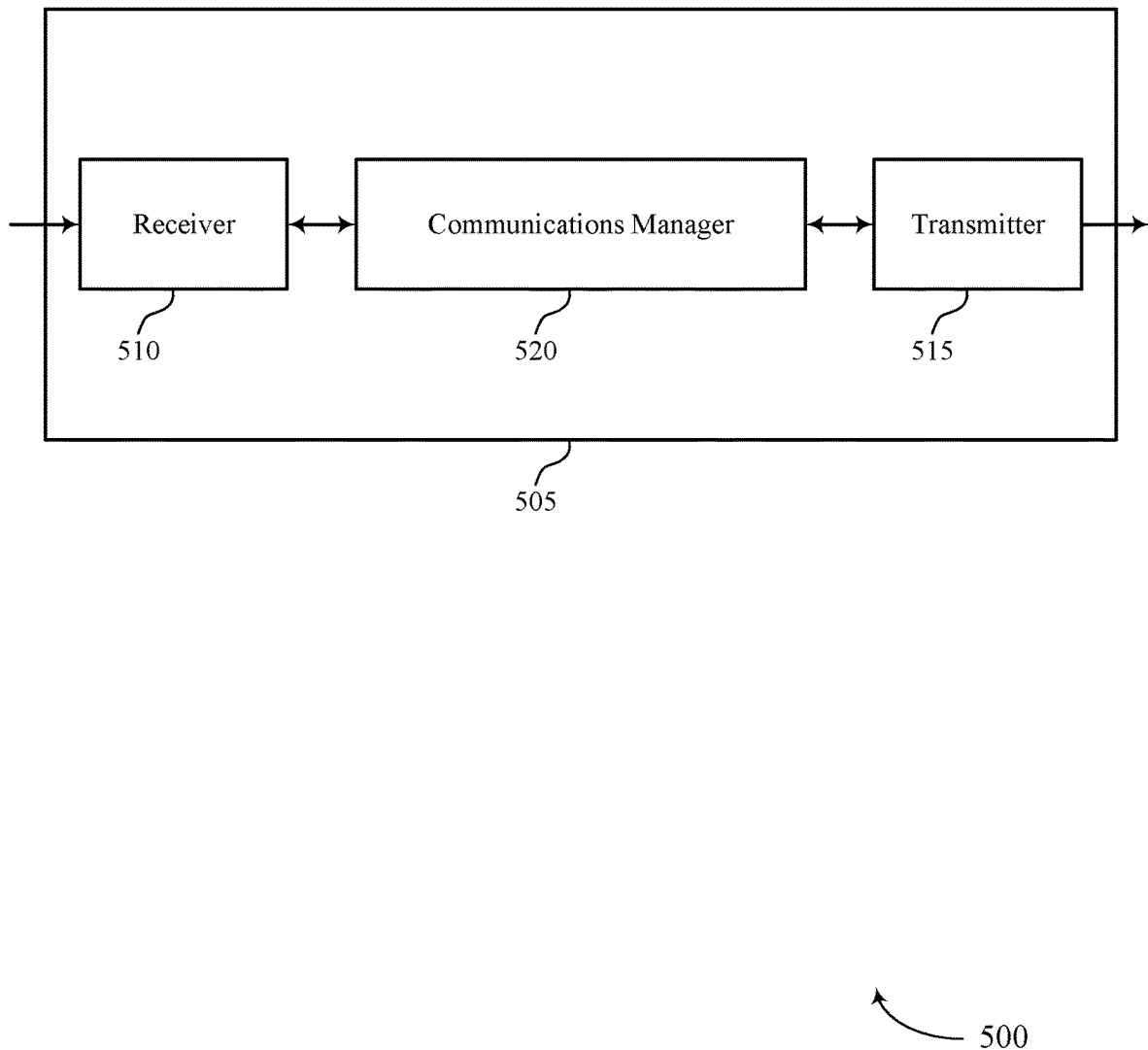
FIGS. 5 and 6 illustrate block diagrams of devices that support DRX enhancement with multiple sidelink feedback channel opportunities in accordance with one or more aspects of the present disclosure.

FIG. 5 illustrates a block diagram 500 of a device 505 that supports DRX enhancement with multiple sidelink feedback channel opportunities in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to DRX enhancement with multiple sidelink feedback channel opportunities). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to DRX enhancement with multiple sidelink feedback channel opportunities). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of DRX enhancement with multiple sidelink feedback channel opportunities as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving, while operating in a DRX mode, a grant scheduling a sidelink data message for the UE over a shared radio frequency spectrum band, the grant indicating a set of feedback channel occasions associated with the sidelink data message. The communications manager 520 may be configured as or otherwise support a means for transmitting at least one feedback message indicating a feedback status of the sidelink data message during at least one feedback channel occasion of the set of feedback channel occasions. The communications manager 520 may be configured as or otherwise support a means for initiating, based on the at least one feedback channel occasion, a round-trip timer associated with the at least one feedback message during which the UE suppresses monitoring for a retransmission of the sidelink data message.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for improved RTT timer initiation when multiple PSFCH candidates are indicated for a sidelink data message. The RTT timer may be initiated after the first PSFCH candidate, after an intermediate candidate, after a last PSFCH candidate, or based on a result of an LBT procedure performed for each PSFCH candidate.

Figure 6:
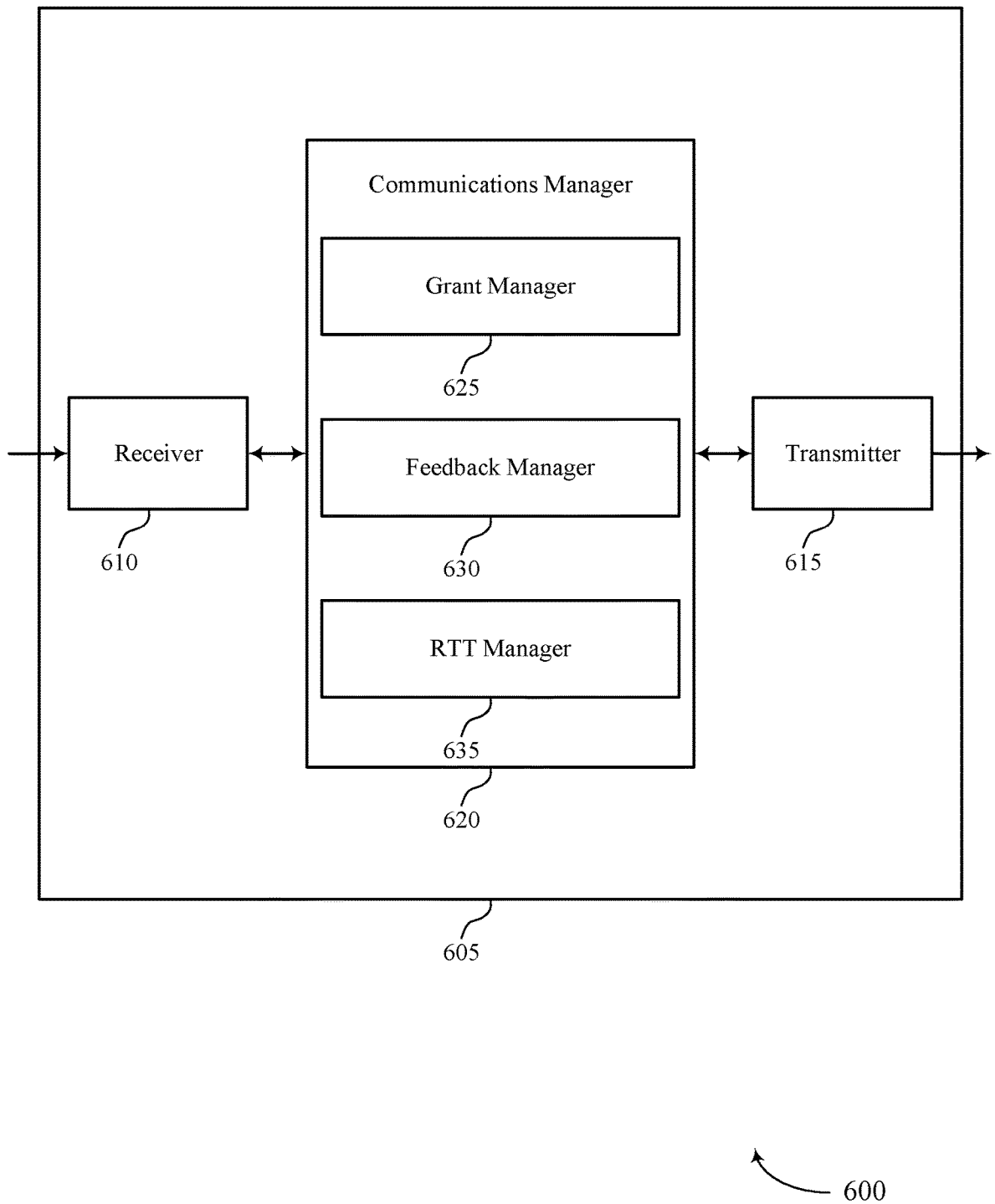

FIG. 6 illustrates a block diagram 600 of a device 605 that supports DRX enhancement with multiple sidelink feedback channel opportunities in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to DRX enhancement with multiple sidelink feedback channel opportunities). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to DRX enhancement with multiple sidelink feedback channel opportunities). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of DRX enhancement with multiple sidelink feedback channel opportunities as described herein. For example, the communications manager 620 may include a grant manager 625, a feedback manager 630, an RTT manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The grant manager 625 may be configured as or otherwise support a means for receiving, while operating in a DRX mode, a grant scheduling a sidelink data message for the UE over a shared radio frequency spectrum band, the grant indicating a set of feedback channel occasions associated with the sidelink data message. The feedback manager 630 may be configured as or otherwise support a means for transmitting at least one feedback message indicating a feedback status of the sidelink data message during at least one feedback channel occasion of the set of feedback channel occasions. The RTT manager 635 may be configured as or otherwise support a means for initiating, based on the at least one feedback channel occasion, a round-trip timer associated with the at least one feedback message during which the UE suppresses monitoring for a retransmission of the sidelink data message.

Figure 7:
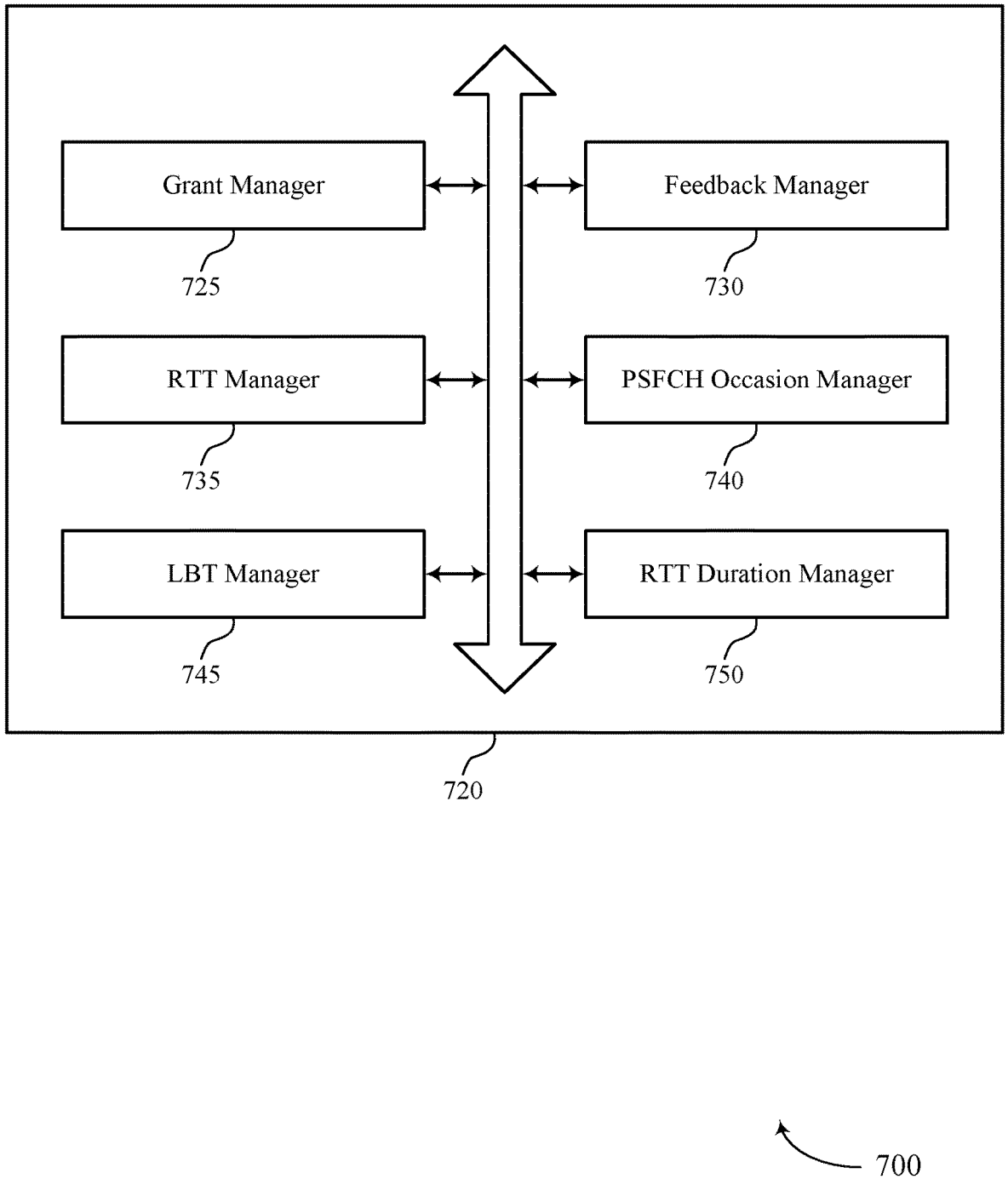
FIG. 7 illustrates a block diagram of a communications manager that supports DRX enhancement with multiple sidelink feedback channel opportunities in accordance with one or more aspects of the present disclosure.

FIG. 7 illustrates a block diagram 700 of a communications manager 720 that supports DRX enhancement with multiple sidelink feedback channel opportunities in accordance with one or more aspects of the present disclosure. The communications manager 720 may be an example of aspects of a communications manager 520, a communications manager 620, or both, as described herein. The communications manager 720, or various components thereof, may be an example of means for performing various aspects of DRX enhancement with multiple sidelink feedback channel opportunities as described herein. For example, the communications manager 720 may include a grant manager 725, a feedback manager 730, an RTT manager 735, an PSFCH occasion manager 740, an LBT manager 745, an RTT duration manager 750, or any combination thereof. Each of these components may communicate, directly or indirectly, with one another (e.g., via one or more buses).

The communications manager 720 may support wireless communication at a UE in accordance with examples as disclosed herein. The grant manager 725 may be configured as or otherwise support a means for receiving, while operating in a DRX mode, a grant scheduling a sidelink data message for the UE over a shared radio frequency spectrum band, the grant indicating a set of feedback channel occasions associated with the sidelink data message. The feedback manager 730 may be configured as or otherwise support a means for transmitting at least one feedback message indicating a feedback status of the sidelink data message during at least one feedback channel occasion of the set of feedback channel occasions. The RTT manager 735 may be configured as or otherwise support a means for initiating, based on the at least one feedback channel occasion, a round-trip timer associated with the at least one feedback message during which the UE suppresses monitoring for a retransmission of the sidelink data message.

In some examples, the PSFCH occasion manager 740 may be configured as or otherwise support a means for identifying a first feedback channel occasion in the set of feedback channel occasions, where the round-trip timer is initiated after the first feedback channel occasion.

In some examples, the PSFCH occasion manager 740 may be configured as or otherwise support a means for determining that an LBT procedure performed before the first feedback channel occasion was unsuccessful. In some examples, the PSFCH occasion manager 740 may be configured as or otherwise support a means for transmitting the at least one feedback message in a subsequent feedback channel occasion of the set of feedback channel occasions associated with a successful LBT procedure while initiating the round-trip timer after the first feedback channel occasion.

In some examples, the PSFCH occasion manager 740 may be configured as or otherwise support a means for extending a duration of a retransmission timer during which the UE monitors a sidelink channel for a second grant scheduling retransmission of the sidelink data message based on the round-trip timer being initiated after the first feedback channel occasion.

In some examples, the LBT manager 745 may be configured as or otherwise support a means for performing an LBT procedure prior to each feedback channel occasion in the set of feedback channel occasions to determine if the feedback channel occasion is available for transmitting the at least one feedback message. In some examples, the LBT manager 745 may be configured as or otherwise support a means for identifying a first feedback channel occasion in the set of feedback channel occasions associated with a successful LBT procedure, where the round-trip timer is initiated after first feedback channel occasion.

In some examples, the LBT manager 745 may be configured as or otherwise support a means for determining that each feedback channel occasion in the set of feedback channel occasions is associated with an unsuccessful LBT procedure. In some examples, the LBT manager 745 may be configured as or otherwise support a means for identifying, based on each feedback channel occasion being associated with an unsuccessful LBT procedure, a last feedback channel occasion in the set of feedback channel occasions, where the round-trip timer is initiated after the last feedback channel occasion.

In some examples, the PSFCH occasion manager 740 may be configured as or otherwise support a means for identifying a last feedback channel occasion in the set of feedback channel occasions, where the round-trip timer is initiated after the last feedback channel occasion.

In some examples, the RTT duration manager 750 may be configured as or otherwise support a means for identifying which feedback channel occasion in the set of feedback channel occasions after which the round-trip timer is to be initiated. In some examples, the RTT duration manager 750 may be configured as or otherwise support a means for selecting a duration for the round-trip timer based on which feedback channel occasion in the set of feedback channel occasions after which the round-trip timer is to be initiated.

In some examples, the RTT duration manager 750 may be configured as or otherwise support a means for determining an expected scheduling time for the retransmission of the sidelink data message, where the duration for the round-trip timer is further based on the expected scheduling time.

In some examples, the RTT manager 735 may be configured as or otherwise support a means for refraining from monitoring a sidelink channel to detect a second grant scheduling the retransmission of the sidelink data message during a duration of the round-trip timer. In some examples, the round-trip timer is initiated after the at least one feedback channel occasion during which the at least one feedback message is transmitted or after a different feedback channel occasion in the set of feedback channel occasions. In some examples, the set of feedback channel occasions include in-band feedback channel occasions or a mixture of in-band feedback channel occasions and out-of-band feedback channel occasions.

Figure 8:
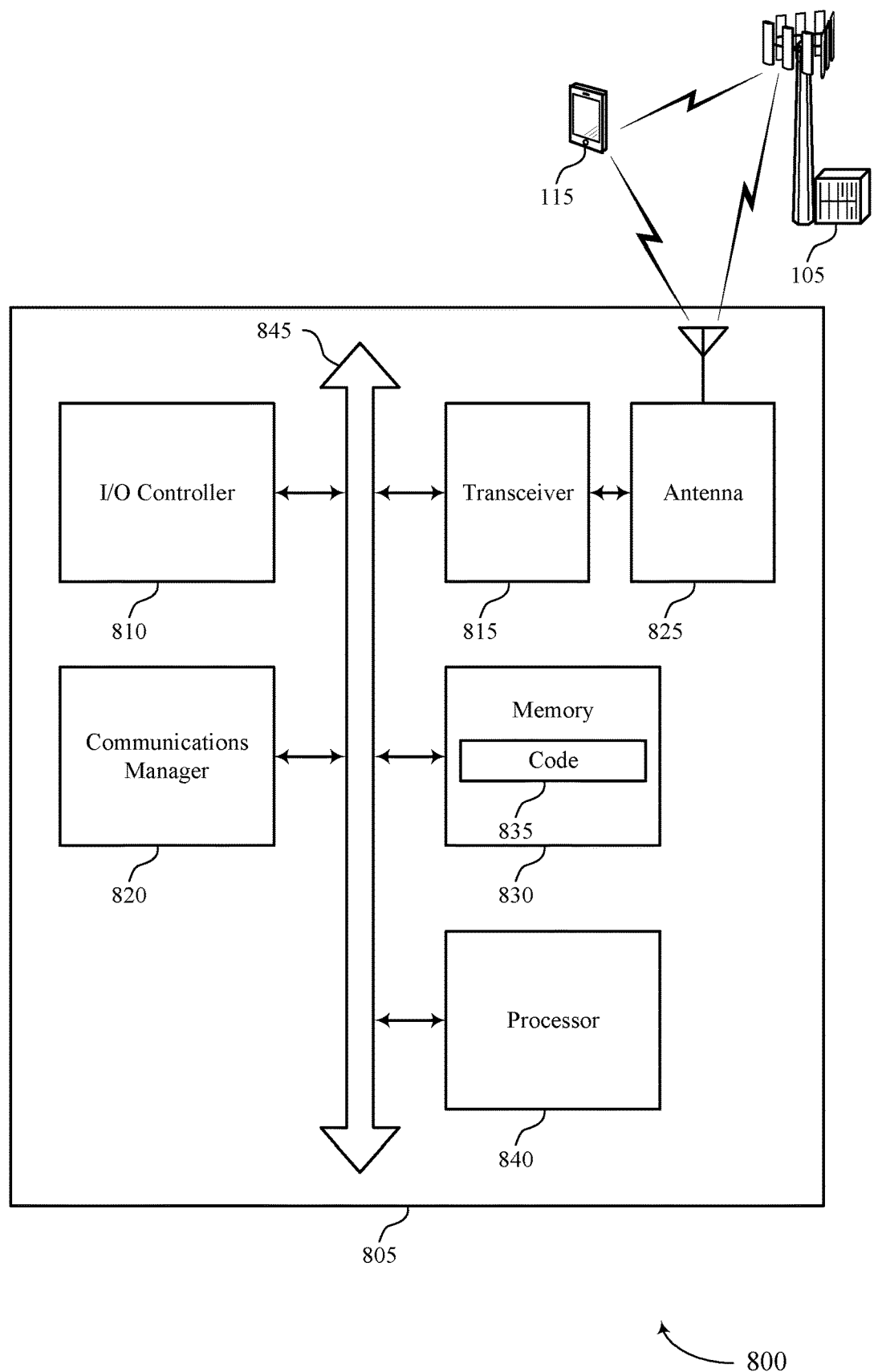
FIG. 8 illustrates a diagram of a system including a device that supports DRX enhancement with multiple sidelink feedback channel opportunities in accordance with one or more aspects of the present disclosure.

FIG. 8 illustrates a diagram of a system 800 including a device 805 that supports DRX enhancement with multiple sidelink feedback channel opportunities in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting DRX enhancement with multiple sidelink feedback channel opportunities). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, while operating in a DRX mode, a grant scheduling a sidelink data message for the UE over a shared radio frequency spectrum band, the grant indicating a set of feedback channel occasions associated with the sidelink data message. The communications manager 820 may be configured as or otherwise support a means for transmitting at least one feedback message indicating a feedback status of the sidelink data message during at least one feedback channel occasion of the set of feedback channel occasions. The communications manager 820 may be configured as or otherwise support a means for initiating, based on the at least one feedback channel occasion, a round-trip timer associated with the at least one feedback message during which the UE suppresses monitoring for a retransmission of the sidelink data message.

By including or configuring the communications manager 820 in accordance with examples as described herein, the device 805 may support techniques for improved RTT timer initiation when multiple PSFCH candidates are indicated for a sidelink data message. The RTT timer may be initiated after the first PSFCH candidate, after an intermediate candidate, after a last PSFCH candidate, or based on a result of an LBT procedure performed for each PSFCH candidate.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of DRX enhancement with multiple sidelink feedback channel opportunities as described herein, or the processor 840 and the memory 830 may be otherwise configured to perform or support such operations.

Figure 9:
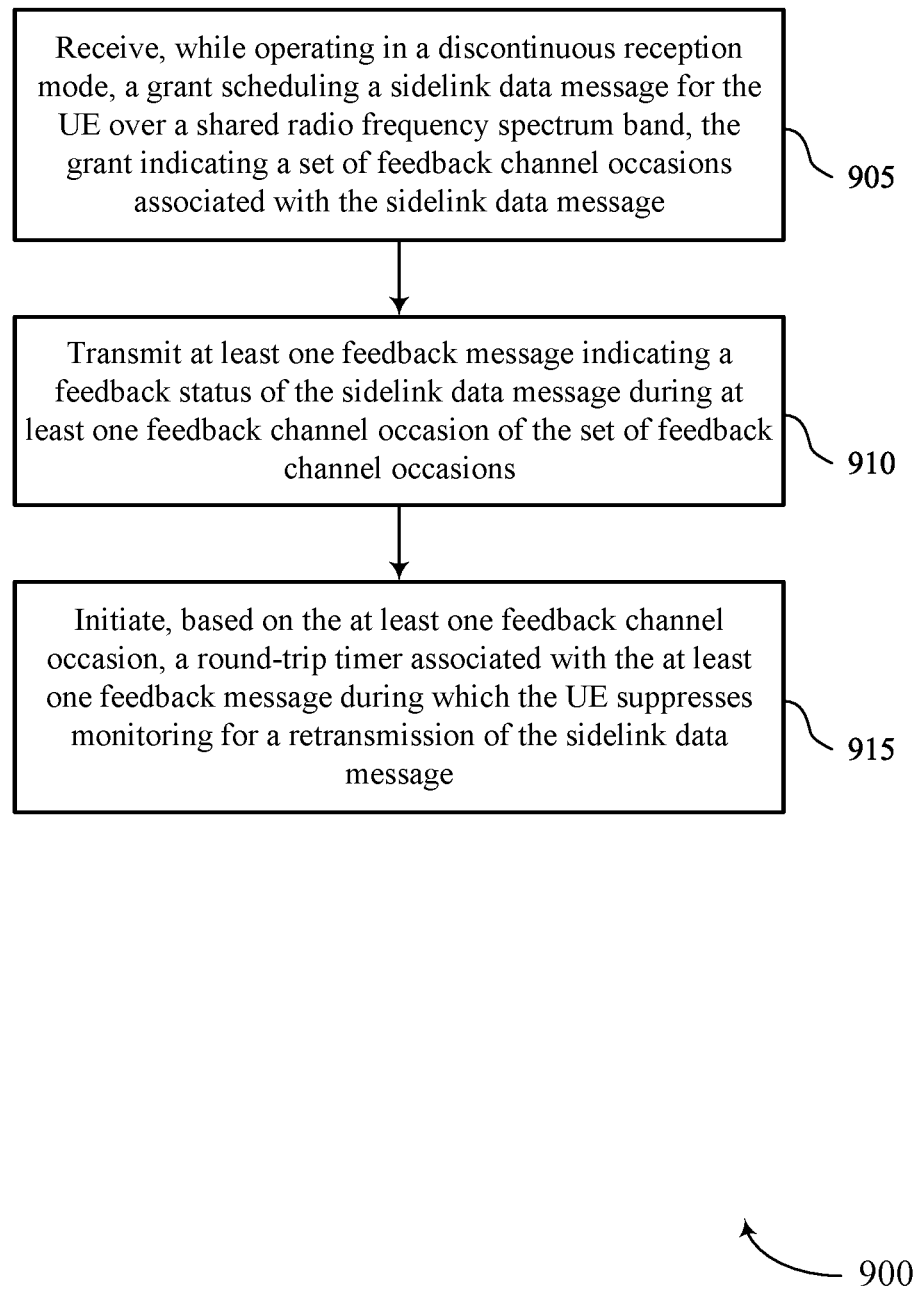
FIGS. 9 through 11 illustrate flowcharts showing methods that support DRX enhancement with multiple sidelink feedback channel opportunities in accordance with one or more aspects of the present disclosure.

FIG. 9 illustrates a flowchart illustrating a method 900 that supports DRX enhancement with multiple sidelink feedback channel opportunities in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include receiving, while operating in a DRX mode, a grant scheduling a sidelink data message for the UE over a shared radio frequency spectrum band, the grant indicating a set of feedback channel occasions associated with the sidelink data message. The operations of 905 may be performed in accordance with examples as disclosed herein. In some examples, aspects of the operations of 905 may be performed by a grant manager 725 as described with reference to FIG. 7.

At 910, the method may include transmitting at least one feedback message indicating a feedback status of the sidelink data message during at least one feedback channel occasion of the set of feedback channel occasions. The operations of 910 may be performed in accordance with examples as disclosed herein. In some examples, aspects of the operations of 910 may be performed by a feedback manager 730 as described with reference to FIG. 7.

At 915, the method may include initiating, based on the at least one feedback channel occasion, a round-trip timer associated with the at least one feedback message during which the UE suppresses monitoring for a retransmission of the sidelink data message. The operations of 915 may be performed in accordance with examples as disclosed herein. In some examples, aspects of the operations of 915 may be performed by an RTT manager 735 as described with reference to FIG. 7.

Figure 10:
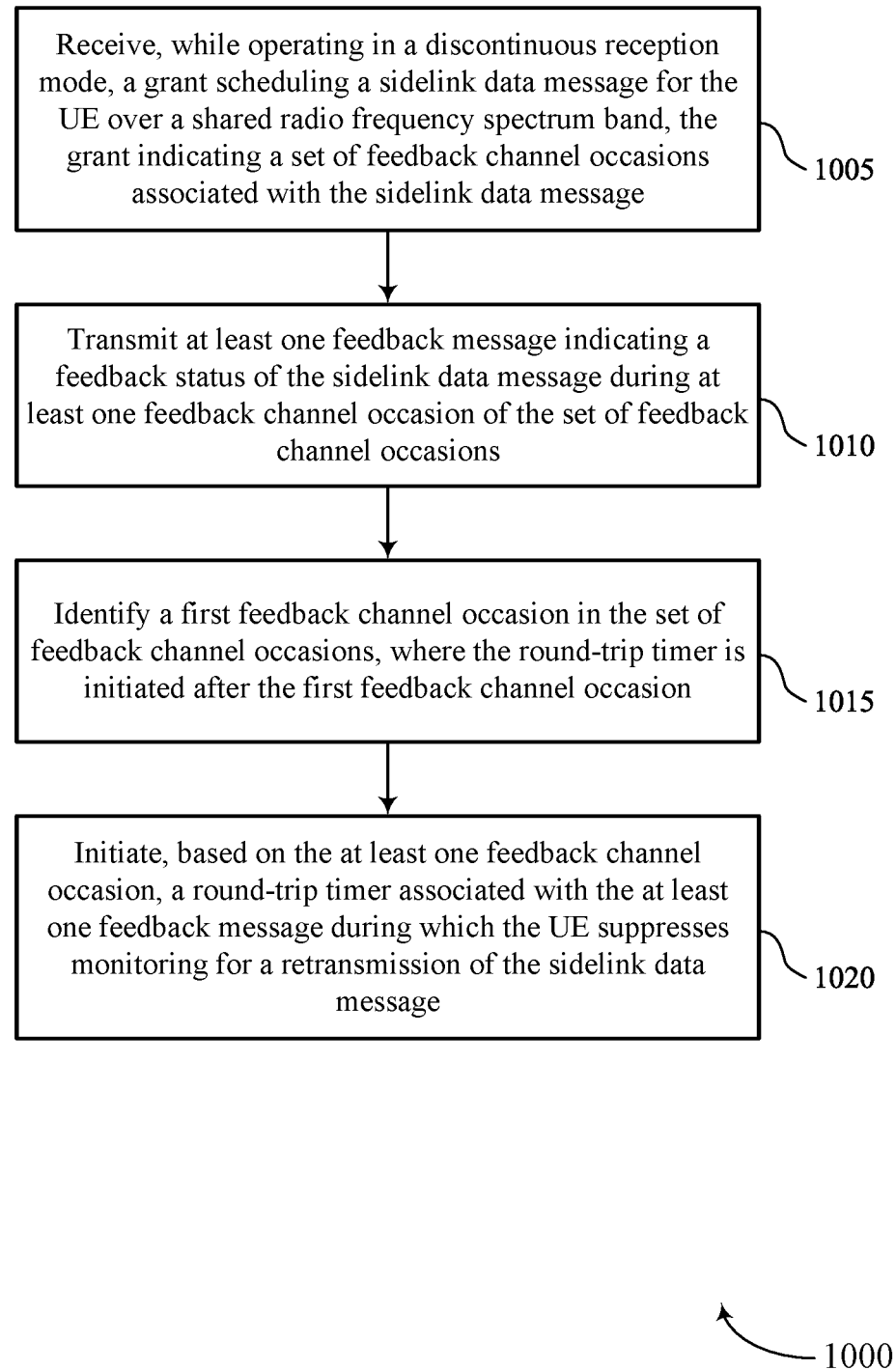

FIG. 10 illustrates a flowchart illustrating a method 1000 that supports DRX enhancement with multiple sidelink feedback channel opportunities in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include receiving, while operating in a DRX mode, a grant scheduling a sidelink data message for the UE over a shared radio frequency spectrum band, the grant indicating a set of feedback channel occasions associated with the sidelink data message. The operations of 1005 may be performed in accordance with examples as disclosed herein. In some examples, aspects of the operations of 1005 may be performed by a grant manager 725 as described with reference to FIG. 7.

At 1010, the method may include transmitting at least one feedback message indicating a feedback status of the sidelink data message during at least one feedback channel occasion of the set of feedback channel occasions. The operations of 1010 may be performed in accordance with examples as disclosed herein. In some examples, aspects of the operations of 1010 may be performed by a feedback manager 730 as described with reference to FIG. 7.

At 1015, the method may include identifying a first feedback channel occasion in the set of feedback channel occasions, where the round-trip timer is initiated after the first feedback channel occasion. The operations of 1015 may be performed in accordance with examples as disclosed herein. In some examples, aspects of the operations of 1015 may be performed by an PSFCH occasion manager 740 as described with reference to FIG. 7.

At 1020, the method may include initiating, based on the at least one feedback channel occasion, a round-trip timer associated with the at least one feedback message during which the UE suppresses monitoring for a retransmission of the sidelink data message. The operations of 1020 may be performed in accordance with examples as disclosed herein. In some examples, aspects of the operations of 1020 may be performed by an RTT manager 735 as described with reference to FIG. 7.

Figure 11:
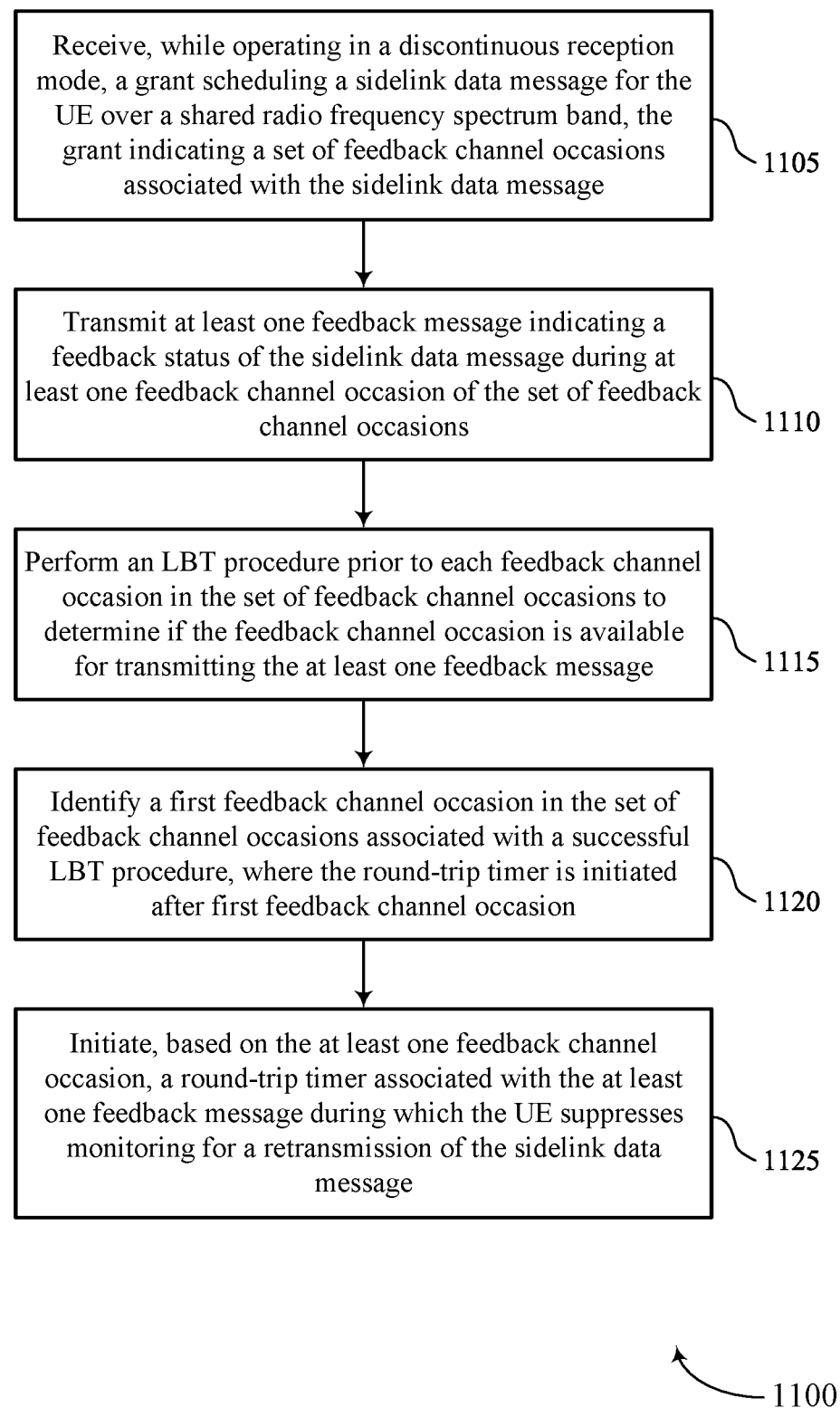

FIG. 11 illustrates a flowchart illustrating a method 1100 that supports DRX enhancement with multiple sidelink feedback channel opportunities in accordance with one or more aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include receiving, while operating in a DRX mode, a grant scheduling a sidelink data message for the UE over a shared radio frequency spectrum band, the grant indicating a set of feedback channel occasions associated with the sidelink data message. The operations of 1105 may be performed in accordance with examples as disclosed herein. In some examples, aspects of the operations of 1105 may be performed by a grant manager 725 as described with reference to FIG. 7.

At 1110, the method may include transmitting at least one feedback message indicating a feedback status of the sidelink data message during at least one feedback channel occasion of the set of feedback channel occasions. The operations of 1110 may be performed in accordance with examples as disclosed herein. In some examples, aspects of the operations of 1110 may be performed by a feedback manager 730 as described with reference to FIG. 7.

At 1115, the method may include performing an LBT procedure prior to each feedback channel occasion in the set of feedback channel occasions to determine if the feedback channel occasion is available for transmitting the at least one feedback message. The operations of 1115 may be performed in accordance with examples as disclosed herein. In some examples, aspects of the operations of 1115 may be performed by an LBT manager 745 as described with reference to FIG. 7.

At 1120, the method may include identifying a first feedback channel occasion in the set of feedback channel occasions associated with a successful LBT procedure, where the round-trip timer is initiated after first feedback channel occasion. The operations of 1120 may be performed in accordance with examples as disclosed herein. In some examples, aspects of the operations of 1120 may be performed by an LBT manager 745 as described with reference to FIG. 7.

At 1125, the method may include initiating, based on the at least one feedback channel occasion, a round-trip timer associated with the at least one feedback message during which the UE suppresses monitoring for a retransmission of the sidelink data message. The operations of 1125 may be performed in accordance with examples as disclosed herein. In some examples, aspects of the operations of 1125 may be performed by an RTT manager 735 as described with reference to FIG. 7.

The following provides an overview of aspects of the present disclosure:

Aspect 1: A method for wireless communication at a UE, comprising: receiving, while operating in a DRX mode, a grant scheduling a sidelink data message for the UE over a shared radio frequency spectrum band, the grant indicating a set of feedback channel occasions associated with the sidelink data message; transmitting at least one feedback message indicating a feedback status of the sidelink data message during at least one feedback channel occasion of the set of feedback channel occasions; and initiating, based at least in part on the at least one feedback channel occasion, a round-trip timer associated with the at least one feedback message during which the UE suppresses monitoring for a retransmission of the sidelink data message.

Aspect 2: The method of aspect 1, further comprising: identifying a first feedback channel occasion in the set of feedback channel occasions, wherein the round-trip timer is initiated after the first feedback channel occasion.

Aspect 3: The method of aspect 2, further comprising: determining that an LBT procedure performed before the first feedback channel occasion was unsuccessful; and transmitting the at least one feedback message in a subsequent feedback channel occasion of the set of feedback channel occasions associated with a successful LBT procedure while initiating the round-trip timer after the first feedback channel occasion.

Aspect 4: The method of any of aspects 2 through 3, further comprising: extending a duration of a retransmission timer during which the UE monitors a sidelink channel for a second grant scheduling retransmission of the sidelink data message based at least in part on the round-trip timer being initiated after the first feedback channel occasion.

Aspect 5: The method of any of aspects 1 through 4, further comprising: performing an LBT procedure prior to each feedback channel occasion in the set of feedback channel occasions to determine if the feedback channel occasion is available for transmitting the at least one feedback message; and identifying a first feedback channel occasion in the set of feedback channel occasions associated with a successful LBT procedure, wherein the round-trip timer is initiated after first feedback channel occasion.

Aspect 6: The method of aspect 5, further comprising: determining that each feedback channel occasion in the set of feedback channel occasions is associated with an unsuccessful LBT procedure; and identifying, based at least in part on each feedback channel occasion being associated with an unsuccessful LBT procedure, a last feedback channel occasion in the set of feedback channel occasions, wherein the round-trip timer is initiated after the last feedback channel occasion.

Aspect 7: The method of any of aspects 1 through 6, further comprising: identifying a last feedback channel occasion in the set of feedback channel occasions, wherein the round-trip timer is initiated after the last feedback channel occasion.

Aspect 8: The method of any of aspects 1 through 7, further comprising: identifying which feedback channel occasion in the set of feedback channel occasions after which the round-trip timer is to be initiated; and selecting a duration for the round-trip timer based at least in part on which feedback channel occasion in the set of feedback channel occasions after which the round-trip timer is to be initiated.

Aspect 9: The method of aspect 8, further comprising: determining an expected scheduling time for the retransmission of the sidelink data message, wherein the duration for the round-trip timer is further based on the expected scheduling time.

Aspect 10: The method of any of aspects 1 through 9, further comprising: refraining from monitoring a sidelink channel to detect a second grant scheduling the retransmission of the sidelink data message during a duration of the round-trip timer.

Aspect 11: The method of any of aspects 1 through 10, wherein the round-trip timer is initiated after the at least one feedback channel occasion during which the at least one feedback message is transmitted or after a different feedback channel occasion in the set of feedback channel occasions.

Aspect 12: The method of any of aspects 1 through 11, wherein the set of feedback channel occasions comprise in-band feedback channel occasions or a mixture of in-band feedback channel occasions and out-of-band feedback channel occasions.

Aspect 13: An apparatus for wireless communication at a UE, comprising a processor; memory coupled with the processor; and instructions stored in the memory and executable by the processor to cause the apparatus to perform a method of any of aspects 1 through 12.

Aspect 14: An apparatus for wireless communication at a UE, comprising at least one means for performing a method of any of aspects 1 through 12.

Aspect 15: A non-transitory computer-readable medium storing code for wireless communication at a UE, the code comprising instructions executable by a processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more processors;
   memory coupled with the one or more processors; and
   instructions stored in the memory and executable by the one or more processors to cause the apparatus to:
   receive, while operating in a discontinuous reception mode, a grant scheduling a sidelink data message for the UE over a shared radio frequency spectrum band, the grant indicating a set of feedback channel occasions associated with the sidelink data message;
   initiate, based at least in part on at least one feedback channel occasion of the set of feedback channel occasions, a round-trip timer associated with at least one feedback message indicating a feedback status of the sidelink data message, wherein the UE suppresses monitoring for a retransmission of the sidelink data message during a duration of the round-trip timer; and
   upon identifying that a listen-before-talk (LBT) procedure performed before a first feedback channel occasion of the set of feedback channel occasions was unsuccessful, transmit the at least one feedback message in a subsequent feedback channel occasion of the set of feedback channel occasions associated with a successful LBT procedure.

2. The apparatus of claim 1, wherein the instructions are further executable by the one or more processors to cause the apparatus to:
   identify the first feedback channel occasion in the set of feedback channel occasions, wherein the round-trip timer is initiated after the first feedback channel occasion.

3. The apparatus of claim 2, wherein the instructions are further executable by the one or more processors to cause the apparatus to:
   extend a duration of a retransmission timer during which the UE monitors a sidelink channel for a second grant scheduling retransmission of the sidelink data message based at least in part on the round-trip timer being initiated after the first feedback channel occasion.

4. The apparatus of claim 1, wherein the instructions are further executable by the one or more processors to cause the apparatus to:
   perform a listen-before-talk (LBT) procedure prior to each feedback channel occasion in the set of feedback channel occasions to determine if the feedback channel occasion is available for transmitting the at least one feedback message; and
   identify a first feedback channel occasion in the set of feedback channel occasions associated with a successful LBT procedure, wherein the round-trip timer is initiated after the first feedback channel occasion.

5. The apparatus of claim 4, wherein the instructions are further executable by the one or more processors to cause the apparatus to:
   determine that each feedback channel occasion in the set of feedback channel occasions is associated with an unsuccessful LBT procedure; and
   identifying, base at least in part on each feedback channel occasion being associated with an unsuccessful LBT procedure, a last feedback channel occasion in the set of feedback channel occasions, wherein the round-trip timer is initiated after the last feedback channel occasion.

6. The apparatus of claim 1, wherein the instructions are further executable by the one or more processors to cause the apparatus to:
   identify a last feedback channel occasion in the set of feedback channel occasions, wherein the round-trip timer is initiated after the last feedback channel occasion.

7. The apparatus of claim 1, wherein the instructions are further executable by the one or more processors to cause the apparatus to:
   identify which feedback channel occasion in the set of feedback channel occasions after which the round-trip timer is to be initiated; and
   select the duration of the round-trip timer based at least in part on which feedback channel occasion in the set of feedback channel occasions after which the round-trip timer is to be initiated.

8. The apparatus of claim 7, wherein the instructions are further executable by the one or more processors to cause the apparatus to:
   determine an expected scheduling time for the retransmission of the sidelink data message, wherein the duration of the round-trip timer is further based on the expected scheduling time.

9. The apparatus of claim 1, wherein the instructions are further executable by the one or more processors to cause the apparatus to:
   refrain from monitoring a sidelink channel to detect a second grant scheduling the retransmission of the sidelink data message during the duration of the round-trip timer.

10. The apparatus of claim 1, wherein the round-trip timer is initiated after the at least one feedback channel occasion during which the at least one feedback message is transmitted or after a different feedback channel occasion in the set of feedback channel occasions.

11. The apparatus of claim 1, wherein the set of feedback channel occasions comprise in-band feedback channel occasions or a mixture of in-band feedback channel occasions and out-of-band feedback channel occasions.

12. A method for wireless communication at a user equipment (UE), comprising:
receiving, while operating in a discontinuous reception mode, a grant scheduling a sidelink data message for the UE over a shared radio frequency spectrum band, the grant indicating a set of feedback channel occasions associated with the sidelink data message;
initiating, based at least in part on at least one feedback channel occasion of the set of feedback channel occasions, a round-trip timer associated with at least one feedback message indicating a feedback status of the sidelink data message, wherein the UE suppresses monitoring for a retransmission of the sidelink data message during a duration of the round-trip timer; and
upon identifying that a listen-before-talk (LBT) procedure performed before a first feedback channel occasion of the set of feedback channel occasions was unsuccessful, transmitting the at least one feedback message in a subsequent feedback channel occasion of the set of feedback channel occasions associated with a successful LBT procedure.

13. The method of claim 12, further comprising:
identifying the first feedback channel occasion in the set of feedback channel occasions, wherein the round-trip timer is initiated after the first feedback channel occasion.

14. The method of claim 13, further comprising:
extending a duration of a retransmission timer during which the UE monitors a sidelink channel for a second grant scheduling retransmission of the sidelink data message based at least in part on the round-trip timer being initiated after the first feedback channel occasion.

15. The method of claim 12, further comprising:
performing a listen-before-talk (LBT) procedure prior to each feedback channel occasion in the set of feedback channel occasions to determine if the feedback channel occasion is available for transmitting the at least one feedback message; and
identifying a first feedback channel occasion in the set of feedback channel occasions associated with a successful LBT procedure, wherein the round-trip timer is initiated after the first feedback channel occasion.

16. The method of claim 15, further comprising:
determining that each feedback channel occasion in the set of feedback channel occasions is associated with an unsuccessful LBT procedure; and
identifying, based at least in part on each feedback channel occasion being associated with an unsuccessful LBT procedure, a last feedback channel occasion in the set of feedback channel occasions, wherein the round-trip timer is initiated after the last feedback channel occasion.

17. The method of claim 12, further comprising:
identifying a last feedback channel occasion in the set of feedback channel occasions, wherein the round-trip timer is initiated after the last feedback channel occasion.

18. The method of claim 12, further comprising:
identifying which feedback channel occasion in the set of feedback channel occasions after which the round-trip timer is to be initiated; and
selecting the duration of the round-trip timer based at least in part on which feedback channel occasion in the set of feedback channel occasions after which the round-trip timer is to be initiated.

19. The method of claim 18, further comprising:
determining an expected scheduling time for the retransmission of the sidelink data message, wherein the duration of the round-trip timer is further based on the expected scheduling time.

20. The method of claim 12, further comprising:
refraining from monitoring a sidelink channel to detect a second grant scheduling the retransmission of the sidelink data message during the duration of the round-trip timer.

21. The method of claim 12, wherein the round-trip timer is initiated after the at least one feedback channel occasion during which the at least one feedback message is transmitted or after a different feedback channel occasion in the set of feedback channel occasions.

22. The method of claim 12, wherein the set of feedback channel occasions comprise in-band feedback channel occasions or a mixture of in-band feedback channel occasions and out-of-band feedback channel occasions.

23. An apparatus for wireless communication at a user equipment (UE), comprising:
means for receiving, while operating in a discontinuous reception mode, a grant scheduling a sidelink data message for the UE over a shared radio frequency spectrum band, the grant indicating a set of feedback channel occasions associated with the sidelink data message;
means for initiating, based at least in part on at least one feedback channel occasion of the set of feedback channel occasions, a round-trip timer associated with the at least one feedback message indicating a feedback status of the sidelink data message, wherein the UE suppresses monitoring for a retransmission of the sidelink data message during a duration of the round-trip timer; and
upon identifying that a listen-before-talk (LBT) procedure performed before a first feedback channel occasion of the set of feedback channel occasions was unsuccessful, transmitting the at least one feedback message in a subsequent feedback channel occasion of the set of feedback channel occasions associated with a successful LBT procedure.

24. The apparatus of claim 23, further comprising:
means for identifying the first feedback channel occasion in the set of feedback channel occasions, wherein the round-trip timer is initiated after the first feedback channel occasion.

25. The apparatus of claim 24, further comprising:
means for extending a duration of a retransmission timer during which the UE monitors a sidelink channel for a second grant scheduling retransmission of the sidelink data message based at least in part on the round-trip timer being initiated after the first feedback channel occasion.

26. The apparatus of claim 23, further comprising:
means for performing a listen-before-talk (LBT) procedure prior to each feedback channel occasion in the set of feedback channel occasions to determine if the feedback channel occasion is available for transmitting the at least one feedback message; and
means for identifying a first feedback channel occasion in the set of feedback channel occasions associated with a successful LBT procedure, wherein the round-trip timer is initiated after the first feedback channel occasion.

27. A non-transitory computer-readable medium storing code for wireless communication at a user equipment (UE), the code comprising instructions executable by a processor to:
- receive, while operating in a discontinuous reception mode, a grant scheduling a sidelink data message for the UE over a shared radio frequency spectrum band, the grant indicating a set of feedback channel occasions associated with the sidelink data message;
- initiate, based at least in part on at least one feedback channel occasion of the set of feedback channel occasions, a round-trip timer associated with the at least one feedback message indicating a feedback status of the sidelink data message, wherein the UE suppresses monitoring for a retransmission of the sidelink data message during a duration of the round-trip timer; and
- upon identifying that a listen-before-talk (LBT) procedure performed before a first feedback channel occasion of the set of feedback channel occasions was unsuccessful, transmit the at least one feedback message in a subsequent feedback channel occasion of the set of feedback channel occasions associated with a successful LBT procedure.

* * * * *